United States Patent [19]
White et al.

[11] Patent Number: 5,475,681
[45] Date of Patent: Dec. 12, 1995

[54] WIRELESS IN-BUILDING TELECOMMUNICATIONS SYSTEM FOR VOICE AND DATA COMMUNICATIONS

[76] Inventors: Richard E. White, 2591 College Hill Cir., Schaumburg, Ill. 60193; Thomas A. Freeburg, 416 N. Belmont Ave., Arlington Heights, Ill. 60004; James J. Berken, 337 W. Greenfield Ave., Lombard, Ill. 60148; Roy T. Ogasawara, 4430 N. Major Ave., Chicago, Ill. 60630; James E. Mitzlaff, 1727 N. Chestnut Ave., Arlington Heights, Ill. 60004; Gregory J. Bedlek, 510A Woodview Rd., Barrington, Ill. 60010

[21] Appl. No.: 166,194

[22] Filed: Jan. 31, 1994

Related U.S. Application Data

[60] Division of Ser. No. 719,212, Jun. 21, 1991, which is a continuation-in-part of Ser. No. 414,792, Sep. 29, 1989, abandoned, Ser. No. 445,238, Dec. 4, 1989, abandoned, Ser. No. 645,383, Jan. 24, 1991, abandoned, Ser. No. 646,924, Jan. 28, 1991, abandoned, and Ser. No. 682,486, Apr. 24, 1991, abandoned.

[51] Int. Cl.$^6$ .......................... H04B 7/15; H04L 12/403; H04L 12/56
[52] U.S. Cl. .......................... 370/60; 370/85.4; 370/85.11; 370/94.1; 379/58; 455/53.1
[58] Field of Search .......................... 370/60, 60.1, 85.1, 370/85.4, 85.5, 85.7, 94.1, 94.2, 94.3, 95.1, 95.2, 95.3, 85.11; 379/58, 59, 60, 61; 455/53.1, 54.1, 57.1

[56] References Cited

U.S. PATENT DOCUMENTS

| | | | |
|---|---|---|---|
| 4,398,289 | 8/1983 | Schoute | 370/93 |
| 4,528,656 | 7/1985 | Morais | 370/30 |
| 4,636,791 | 1/1987 | Burke et al. | 340/825.52 |
| 4,648,090 | 3/1987 | Maddern et al. | 370/110.1 |
| 4,654,654 | 3/1987 | Butler et al. | 340/825.5 |
| 4,672,601 | 6/1987 | Ablay | 370/31 |
| 4,672,658 | 6/1987 | Kavehrad et al. | 379/63 |
| 4,680,755 | 7/1987 | Reames | 370/85 |
| 4,684,941 | 8/1987 | Smith et al. | 340/825.52 |
| 4,736,409 | 4/1988 | Hasegawa et al. | 379/269 |
| 4,754,453 | 6/1988 | Eizenhofer | 370/95 |
| 4,755,986 | 7/1988 | Hirata | 370/60 |
| 4,789,983 | 12/1988 | Acampora et al. | 370/96 |

(List continued on next page.)

OTHER PUBLICATIONS

Advanced Peripherals, IEEE 802.3 Local Area Network Guide, pp. 7–12 by National Semiconductor Corporation.

*Primary Examiner*—Hassan Kizou
*Attorney, Agent, or Firm*—Val Jean F. Hillman

[57] ABSTRACT

An improved network interface architecture for a packet switch provides a mechanism for handling voice and data packets. Bandwidth allocation can be changed because control and data memories are synchronized to one another. A hierarchical addressing technique is employed to enhance flexibility in handling packet information. This method permits packet message data and certain packet control data to be stored in memory locations without having to be duplicated at a different memory location prior to transmission of the packet. In an exemplary wireless TDMA packet network a control module (CM) sends a time stamp relative to the beginning of its frame in a synchronization packet allowing each of a plurality of user modules (UM) to maintain synchronization relative to the CM. The CM uses a plurality of directional antennas and transmits the synchronization packets over each antenna over a predetermined number of frames. The UMs use a receive time stamp to identify the beginning of a received synchronization packet. The difference between the time stamps combined with a delay constant is used by the UMs to adjust time synchronization to the CM frame. Packets are communicated between the controller and the peripherals at the UM and CM over a bus using a communication protocol which increases the efficiencies of packet communications by allowing additional direct command lines between the communications controller and peripherals.

5 Claims, 16 Drawing Sheets

U.S. PATENT DOCUMENTS

| | | | |
|---|---|---|---|
| 4,791,629 | 12/1988 | Burns et al. | 370/85 |
| 4,807,222 | 2/1989 | Amitay | 370/85 |
| 4,870,408 | 9/1989 | Zdunek et al. | 340/825.03 |
| 4,881,271 | 11/1989 | Yamauchi et al. | 455/56 |
| 4,890,280 | 12/1989 | Hirata | 370/60 |
| 4,896,319 | 1/1990 | Lidinsky et al. | 370/60 |
| 4,905,231 | 2/1990 | Leung et al. | 370/94.1 |
| 4,922,486 | 5/1990 | Lidinsky et al. | 370/60 |
| 4,933,935 | 6/1990 | Adams | 370/85.7 |
| 4,961,188 | 10/1990 | Lau | 370/94.2 |
| 4,969,146 | 11/1990 | Twitty et al. | 370/85.1 |

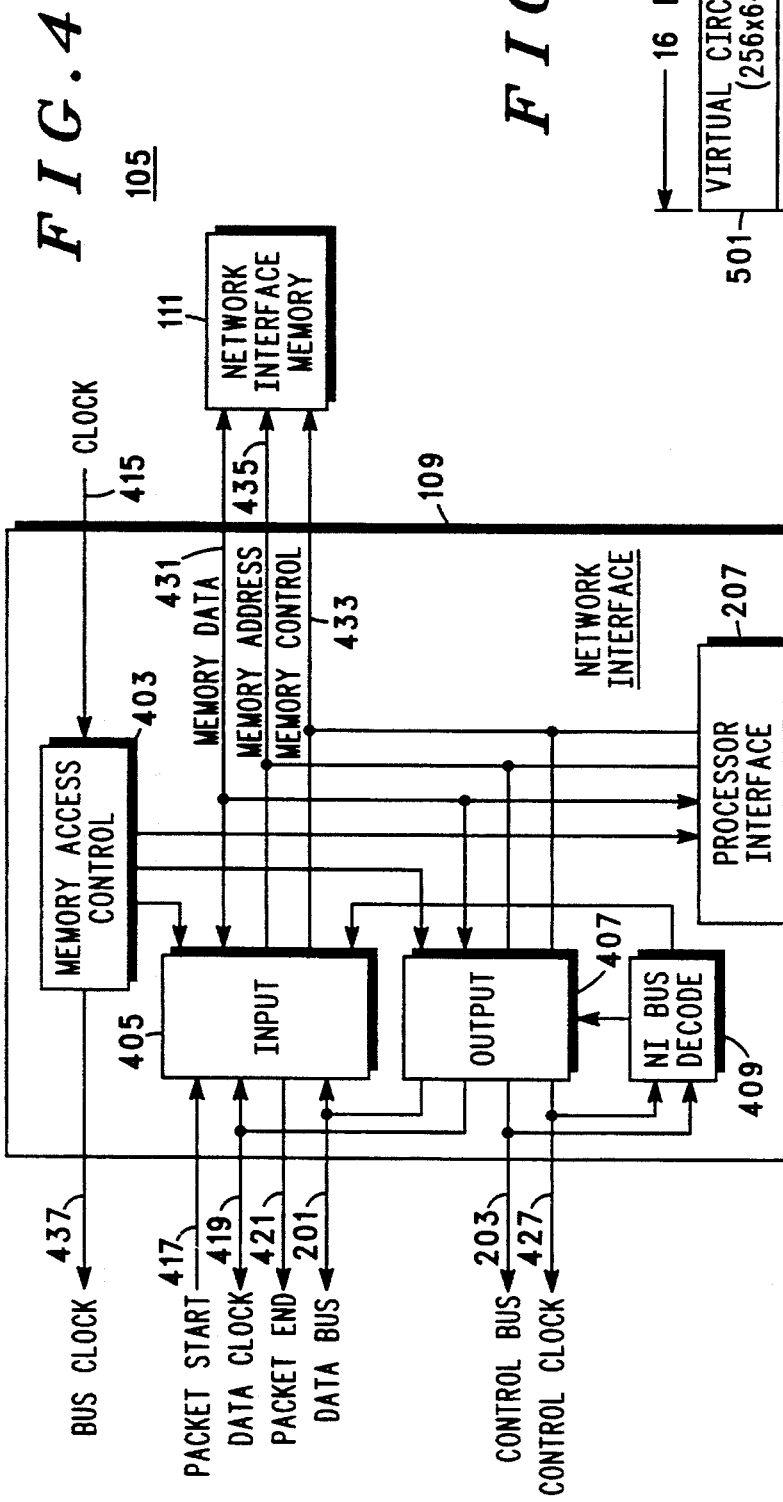

| 15 | 8 | 7 | 0 | |
|---|---|---|---|---|
| ADDRESS 0 − BYTE 0 | | ADDRESS 0 − BYTE 1 | | 0 |
| ADDRESS 0 − BYTE 2 | | ADDRESS 0 − BYTE 3 | | 2 |
| ADDRESS 0 − BYTE 4 | | ADDRESS 0 − BYTE 5 | | 4 |
| ADDRESS 0 − BYTE 6 | | ADDRESS 0 − BYTE 7 | | 6 |
| ADDRESS 0 − BYTE 8 | | ADDRESS 0 − BYTE 9 | | 8 |
| ADDRESS 0 − BYTE 10 | | ADDRESS 0 − BYTE 11 | | 10 |
| ADDRESS 0 − BYTE 12 | | ADDRESS 0 − BYTE 13 | | 12 |
| ADDRESS 0 − BYTE 14 | | ADDRESS 0 − BYTE 15 | | 14 |
| ADDRESS 1 − BYTE 0 | | ADDRESS 1 − BYTE 1 | | 16 |
| ADDRESS 1 − BYTE 2 | | ADDRESS 1 − BYTE 3 | | 18 |
| ADDRESS 1 − BYTE 4 | | ADDRESS 1 − BYTE 5 | | 20 |
| ADDRESS 1 − BYTE 6 | | ADDRESS 1 − BYTE 7 | | 22 |
| ADDRESS 1 − BYTE 8 | | ADDRESS 1 − BYTE 9 | | 24 |
| ADDRESS 1 − BYTE 10 | | ADDRESS 1 − BYTE 11 | | 26 |
| ADDRESS 1 − BYTE 12 | | ADDRESS 1 − BYTE 13 | | 28 |
| ADDRESS 1 − BYTE 14 | | ADDRESS 1 − BYTE 15 | | 30 |
| ⋮ | | ⋮ | | |
| ADDRESS 15 − BYTE 12 | | ADDRESS 15 − BYTE 13 | | 252 |
| ADDRESS 15 − BYTE 14 | | ADDRESS 15 − BYTE 15 | | 254 |

FIG.6
600

| 15 | 8 | 7 | 0 |
|---|---|---|---|
| No. OF ADD'L BYTE(M1) | | PACKET LENGTH(N1)MSB | |
| PACKET LENGTH(N1)LSB | | INFO FIELD BYTE 1 | |
| INFO FIELD BYTE 2 | | INFO FIELD BYTE 3 | |
| INFO FIELD BYTE 4 | | INFO FIELD BYTE 5 | |
| ⋮ | | ⋮ | |
| INFO FIELD BYTE N1 | | ADDITIONAL BYTE 1 | |
| ⋮ | | ⋮ | |
| ADDITIONAL BYTE M1 | | TIME STAMP MSB | |
| TIME STAMP LSB | | No. OF ADD'L BYTE(M2) | |
| PACKET LENGTH(N2)MSB | | PACKET LENGTH(N2)LSB | |
| INFO FIELD BYTE 1 | | INFO FIELD BYTE 2 | |
| INFO FIELD BYTE 3 | | INFO FIELD BYTE 4 | |
| ⋮ | | ⋮ | |

FIG.7
700

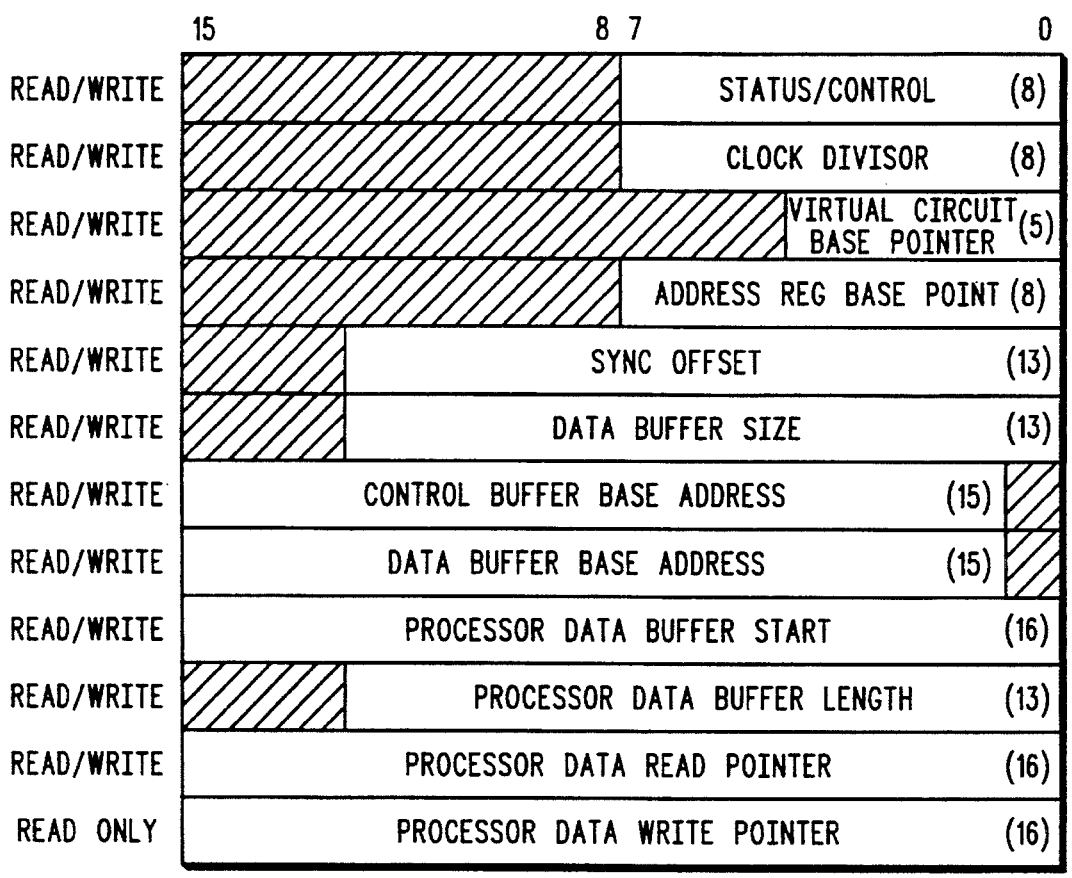
*800* FIG.8
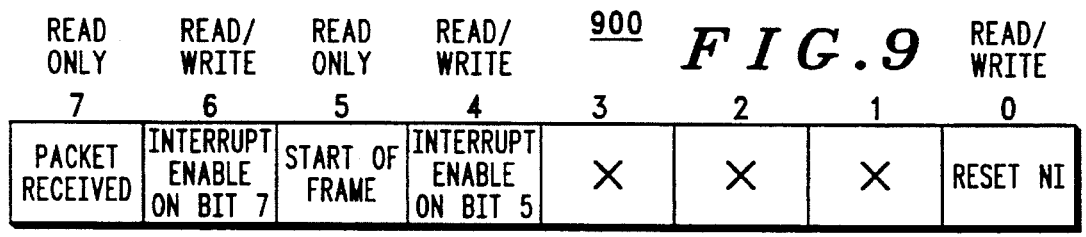
*900* FIG.9
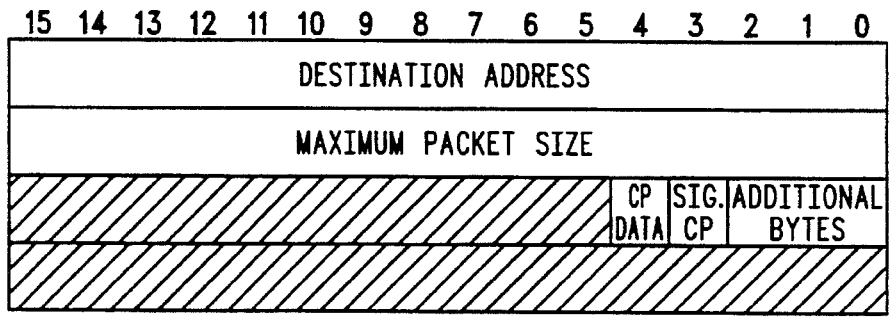
*1000* FIG.10

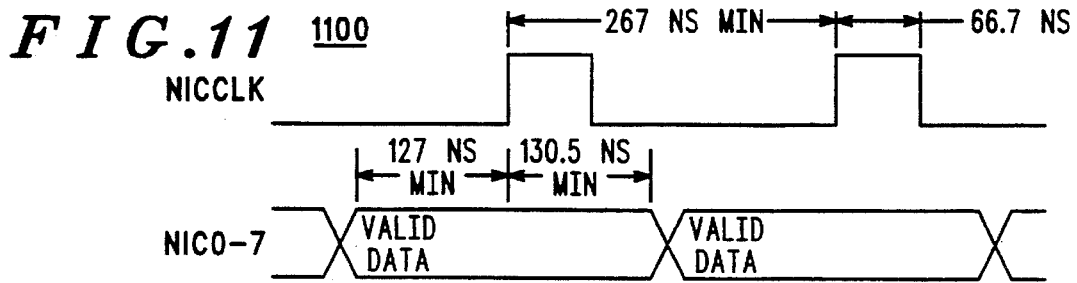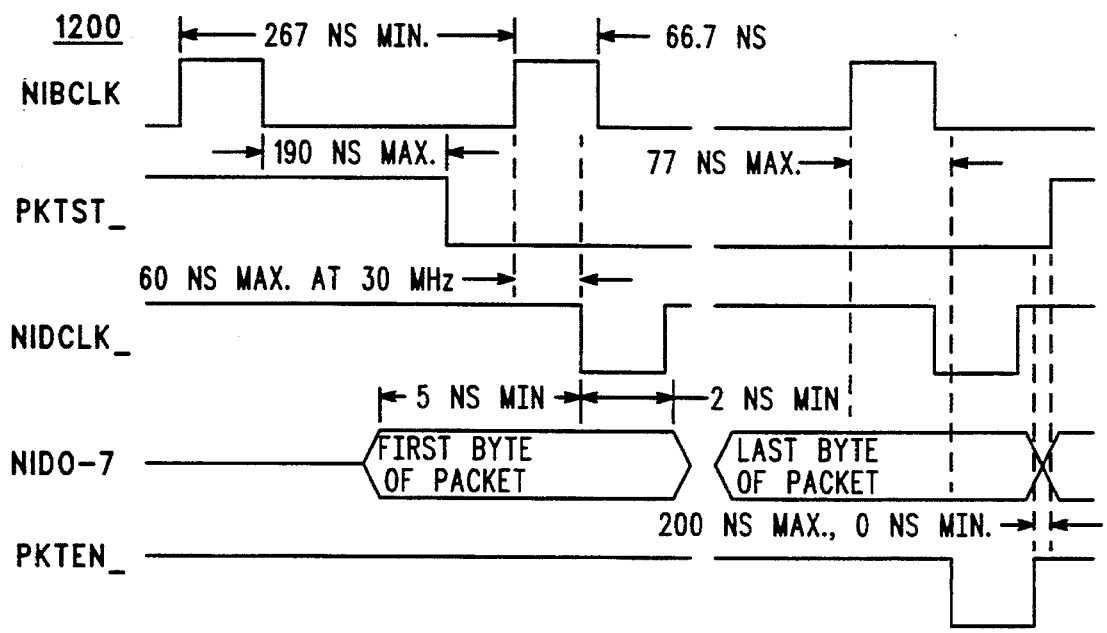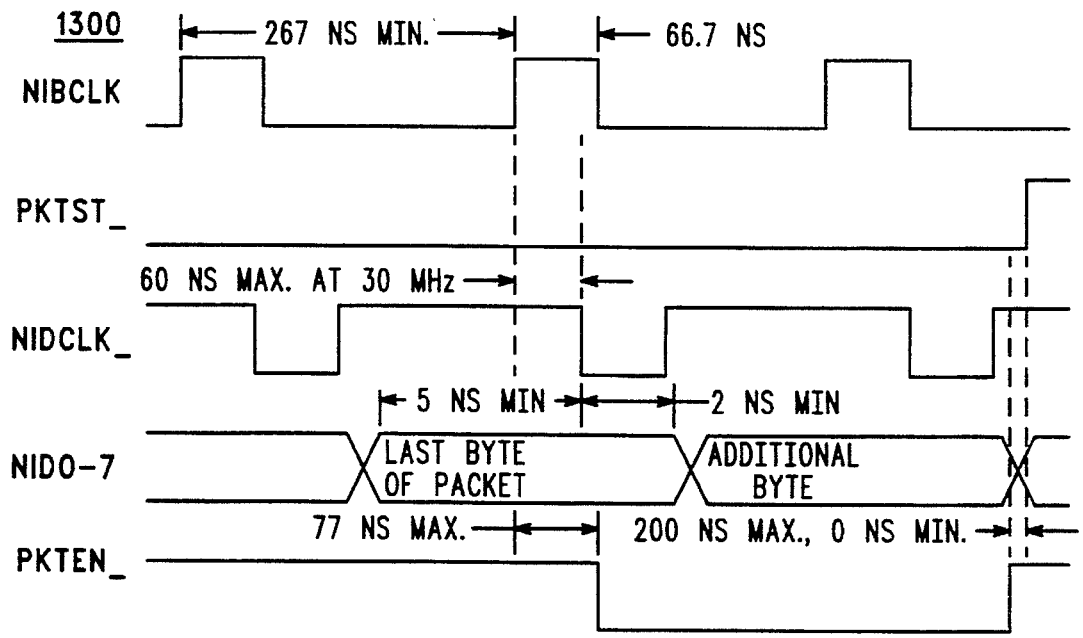

WIRELESS IN-BUILDING TELECOMMUNICATIONS SYSTEM FOR VOICE AND DATA COMMUNICATIONS

This application is a Division of Ser. No. 07/719,212 filed Jun. 21, 1991, which is a Continuation-In-Part of Ser. No. 07/414,792, filed Sep. 29, 1989 now Abandoned, and a Continuation-In-Part of Ser. No. 07/445,238, filed Dec. 4, 1989 now Abandoned, and a Continuation-In-Part of Ser. No. 07/645,383, filed Jan. 24, 1991 now Abandoned, and a Continuation-In-Part of Ser. No. 07/646,924, filed Jan. 28, 1991 now Abandoned and a Continuation-In-Part of Ser. No. 07/682,486, filed Apr. 24, 1991 now Abandoned.

This invention pertains to voice/data packet switches and more particularly to a wireless in-building telecommunications system for voice and data communications.

BACKGROUND OF THE INVENTION

Voice and data switches are known in the prior art. Packet switching is also known. In the past, however, synchronization for the control of the devices sending and receiving information packets in a voice/data packet switch has been a problem. This problem has been related to the problem of dynamically allocating the packet bandwidth between the various peripheral devices attached to the switch for voice information and data information. Another related factor has been the network interface architecture for the switch. The network interface architectures of past switches have used the same bus for both data and control. When coupled with the problem of dynamically allocating bandwidth on the bus, this network interface architecture has resulted in the switch having a low switching capacity and throughput. These performance problems become even more significant in the context of modern fast packet protocols. It would be desirable, therefore, to provide a voice/data packet switch with an improved network interface architecture.

In a synchronous system a clock signal corresponding to intervals of data transmission is either made directly available to terminals within the network or it is derived from signals sent by the transmitting terminal. In such a system, a master terminal defines the clock information which is derived by slave terminals. Mainframe computer networks which maintain constant communication with slave devices are an example of such networks.

Asynchronous communications differ in that clock information is not provided. Another mechanism must be utilized in order to define the beginning and end of each character or period. In modem networks start and stop bits are utilized by the transmitting modem so that the receiving modem can identify the beginning and end of a transmitted character.

In a TDMA packet network in which each frame contains a plurality of time slots allocated for different users or purposes, it is critical that the receiving terminal be able to properly correlate the beginning of each frame and of each time slot in order to properly decode the transmitted information. It is known in packet systems to utilize a time stamp which is transmitted as part of the packet. For example, see U.S. Pat. Nos. 4,530,091 and 4,894,823.

In a wireless packet TDMA system, two types of synchronization is required. First, the beginning of each frame and each time slot (packet) within each frame must be identified. Such identification can be accomplished by transmitting a known data pattern for a predetermined number of bits. This pattern is recognized by the receiving terminal and the beginning of the frame or packet is determined. In a TDMA network in which a master node defines the frame and packet timing for remote terminals, each terminal must be aligned in time relative to the start of the node frame in order to properly receive and transmit information at a predefined time slot within the frame. Problems in acquiring and maintaining this type of synchronization exist especially in a wireless TDMA packet network in which different directional antennas are used for communications. Thus there exists a need for an improved method for maintaining time synchronization in a wireless TDMA packet network in which multiple antennas are utilized.

Packet data networks convey information from an originator to a specified addressee by incorporating the information into packets. Each packet contains a preamble (control data) and information (message data). The preamble typically includes packet network control data, synchronization information, and addressee destination information. The information portion contains part of the total originator's message.

The packet originated by the addressor is typically not directly received by the addressee. The packet may be relayed by several intermediate stations before reaching the final addressee destination. As the transmission speeds of packet networks increase, it becomes increasingly important for relay stations to be able to efficiently handle and process packets.

In a direct method for handling packets, received packets are stored in a memory location. The destination of the packet contained at the preamble is checked as well as other packet network control information. Correct receipt or validation of the control information and the packet data information is checked. Assuming no errors are detected, a new packet corresponding to the received packet is created and stored in a different memory location for transmission. At the appropriate time, the reconstituted packet is retransmitted by the relay station towards its final destination.

Packets are handled in a different manner in an Ethernet local area network. A buffer ring structure comprised of a series of contiguous fixed length byte buffers are utilized for storage of received packets. The beginning and end location of the stored packet is identified by addresses held in a page start and a page stop register. Successive buffers in the ring are utilized to store the packet. Multiple packets can be consecutively stored in the ring structure. The packets are normally removed from the receive buffer ring in FIFO order and are reconstituted for retransmission in memory separate from this ring.

There exists a need for an improved method for organizing and handling packets that minimizes intermediate data transfer to additional memory locations prior to retransmission of the packet Packet protocols become increasingly inefficient as the amount of data to be transmitted per packet decreases because of the required packet overhead required for each packet. Although short commands can be transmitted from one point to another using packets, a substantial delay exists before the receiving device can act upon the command due to the time requirements of packet transmission and packet disassembly before the command can be forwarded to the destination device.

In a conventional direct control systems each function to be controlled is assigned a separate wire or communication channel which carries a predetermined command from a controller to the device implementing the function. Such systems exist for a variety of applications and are efficient where a limited number of commands are to be transmitted to specific devices. These systems become increasingly complex as the number of commands and devices to be controlled increase. No addressing is required in these systems since each dedicated path has a preassigned single function to control.

There exists a need for a system and method which can carry information utilizing packets while minimizing the inefficiencies related to the transmission of commands to associated devices.

BRIEF DESCRIPTION OF THE DRAWINGS

FIG. 4 is a high-level block diagram for the network interface.

FIG. 5 shows a network interface memory map.

FIG. 6 shows address registers.

FIG. 7 shows processor data memory area for the network interface.

FIG. 8 shows network interface base registers.

FIG. 9 shows a status/control register.

FIG. 10 shows a virtual circuit register.

FIG. 11 is a timing diagram showing the network interface control transfer timing.

FIG. 12 is a timing diagram showing a data transfer from a device to the network interface with no additional bytes.

FIG. 13 is a timing diagram showing a data transfer from a device to the network interface with additional bytes.

DESCRIPTION OF A PREFERRED EMBODIMENT

Figure 1:
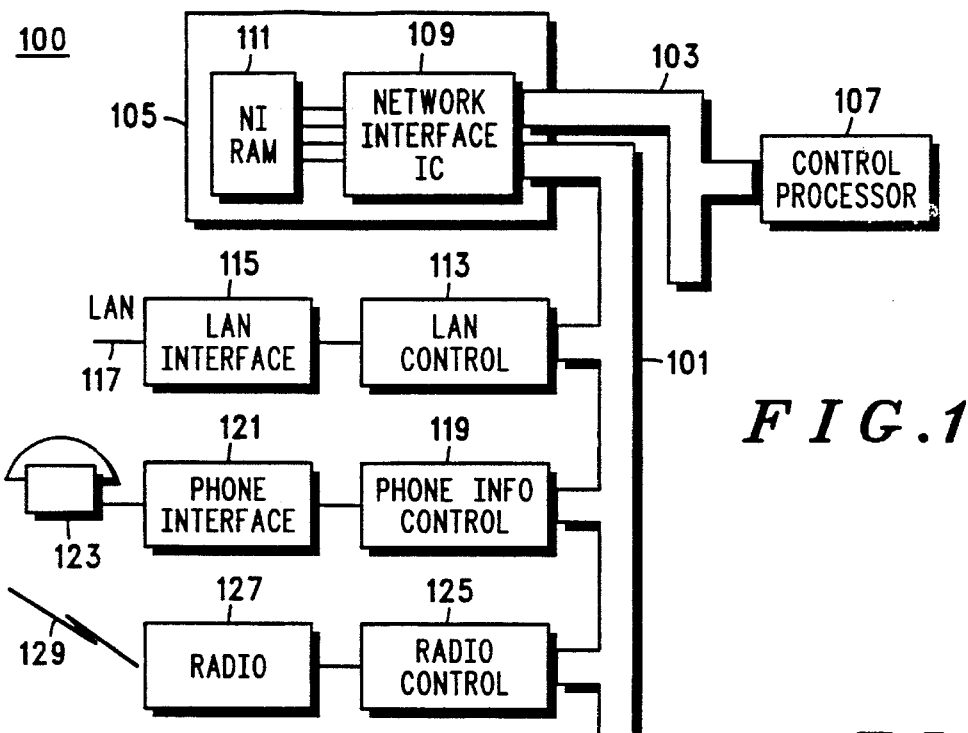
FIG. 1 shows a first embodiment of a packet/fast packet switch for voice and data.

Referring now to FIG. 1, it is seen that the Network Interface 105 is the focus of the packet switch device 100 which, in accordance with the present embodiment is a LAN device (both Node and UM). It connects the various interfaces on the LAN (both cable and radio) to one another and to the Control Processor 107, providing time-division and fast-packet switching. Information is transferred among these interfaces via the Network Interface Memory 111 that is accessible both by the control sections of the Network Interface (both input and output), and by the Control Processor 107. The memory 111 preferably consists of a control memory portion and a data memory portion. Information flow on the LAN side is via the Network Interface Bus (NI-Bus) 101, which is designed to pass data at rates up to, for example, 5 million bytes per second, and to handle the corresponding control information at a similar rate. The microprocessor bus 103 couples the network interface 105 to the control processor 107, hereinafter collectively referred to as the communications controller.

Figure 2:
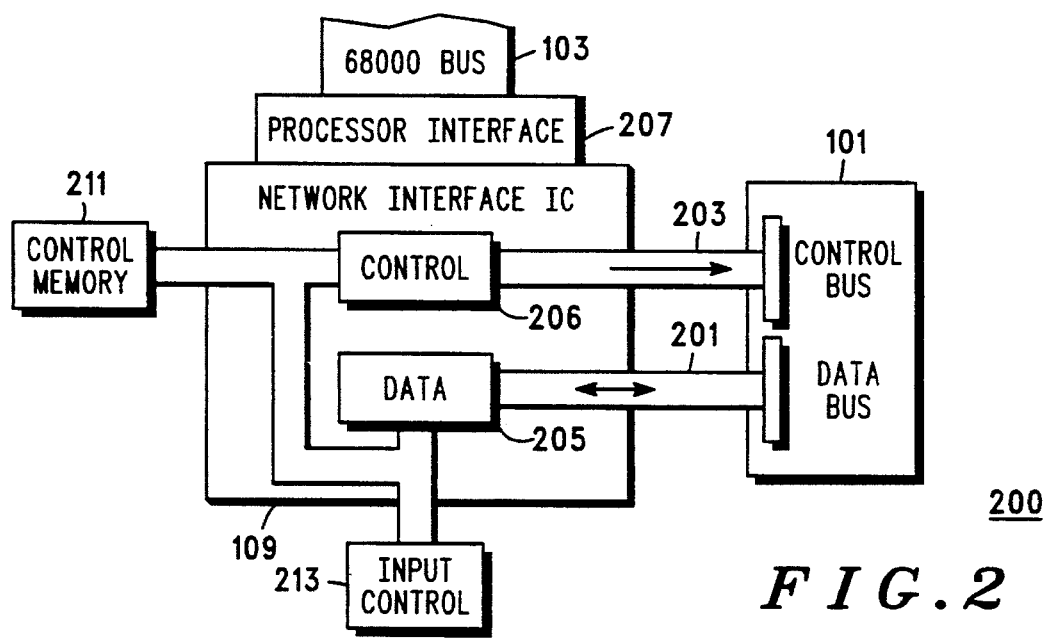
FIG. 2 shows the network interface bus for the first embodiment.

Referring now to FIG. 2, the interaction between the Network Interface Memory 111 and the NI-Bus 101 is shown. The Output Control circuitry 206 of the Network Interface chip 109, sequentially steps through the Control memory 211 and presents address and command bytes to the Control Bus 203. This information controls which device is driving the NI-Bus 101 and which device is listening. All NI-Bus devices, including the Network Interface 105, listen to the Control Bus 203 to determine what the activity is on the Data Bus 201. The Output Control circuitry also sequentially steps through the Data memory. If the Network Interface 105 is driving the bus 101, the information in the Data memory 213 will be output to the Data Bus 201. If the Network Interface 105 is listening to the Data Bus 201, the Input Control 205 will accept the data and put it in the proper area of Network Interface Memory 111. The Network Interface 105 can both listen and drive the bus 101 at the same time. This allows the Network Interface 105 to be put in a loopback mode.

Figure 3:
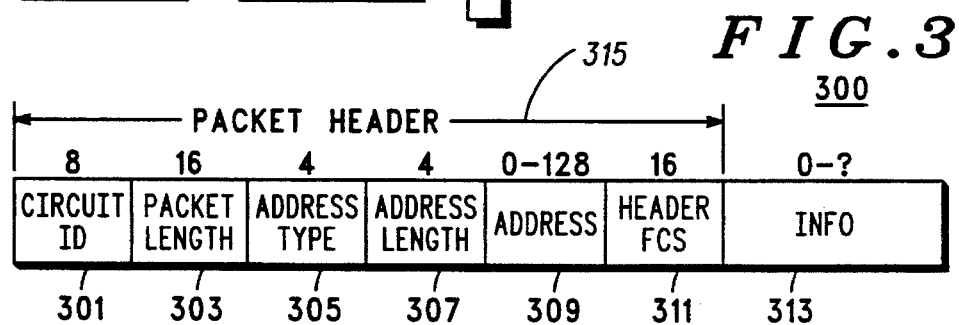
FIG. 3 shows a packet.

FIG. 3 shows the configuration of a standard packet 300. When a start packet signal (described in a later section) is received from a NI-Bus 101 peripheral (for instance, the radio link 125, 127, 129), the first byte 301 received by the Network Interface is the Virtual Circuit ID. This field 301 is used to make a pointer into an area of NI-Memory 111 that holds control information for up to 256 virtual circuits—primarily packet destination addresses. The Input Control uses this information to store the packet information field in the appropriate location in NI-Memory.

The Packet Length field 303 is evaluated next, and checked against the Max Packet Size field in the appropriate Virtual Circuit Register, described in a later section. If the Packet Length is greater than the Max Packet Size, the Info field of the packet will not be stored.

The Address Type field 305 is used as an offset into a field of 16 device Address Registers, each up to 128 bits long. The appropriate Address Register, described in a later section, is then compared against the Address field 309 in the received packet, up to the number of bytes indicated in the Address Length field 307 of the packet. If the address 309 does not match, the Info field 313 is not stored. Note than an address of zero length is always seen as a match, and thus represents an all call.

The CRC checker, in the Network Interface, will check the CRC for the entire packet header including the Header FCS 311. The result of the checker will be zero for a valid header. If the CRC check is invalid, the Network Interface will generate a Packet End signal.

Three conditions must be met in order for the Network Interface 105 to store the Info field into NI Memory 111:

1. The Packet Length 303 in the packet header 315 must be less than or equal to Max Packet Size stored in the Virtual Circuit Register.
2. The Address 309 in the packet header 315 must be equal to the address contained in the Address Register defined by the Address Type 305 for the number of bytes defined by the Address Length 307. Note: The two addresses need not be inherently the same. This allows Group Calls.
3. The CRC check must be valid.

All of these memory areas are defined in a set of NI Base Registers, described in a later section, that are accessible to the Control Processor 107.

Thus, the Control Processor 107 completely defines the output areas of the frame, and the timing and device selection of input areas. It writes the necessary data into the Control area 211, and, where appropriate, puts data into the Data area 213—for instance, the appropriate headers to be transmitted.

Then, the Control Processor 107 sets up the appropriate addresses (read initially from a personality module containing, among other things, the Electronic Serial Number of the particular device), establishes appropriate Virtual Circuit parameters (e.g., a data packet interface to the Control Processor), and sets the appropriate pointers in the Base Registers.

Referring to FIG. 4 there is shown the network interface 105. The Network Interface is made up of six basic blocks: Input 405, Output 407, NI-Bus Decode 409, Memory Access Control 403, Processor Interface 207, and Memory 111. The memory 111 is not currently contained in the Network Interface ASIC 109.

The Input block 405 evaluates the header of the incoming packet and determines what to do with the packet. When a Packet Start indication 417 is received along with the Data Clock 419, the Input section 405 loads the header 315 and determines if the packet 300 is for this device and determines the routing. Once the routing is determined, the information field of the packet is loaded into the proper area in the Network Interface memory 111.

The Input block 405 is connected to the outside world via an 8-bit wide bi-directional data bus, the Network Interface Data Bus 201. The NI Data Bus 201 has a maximum clock rate of 5 MHz. The Data Clock signal 419 indicates when the data is stable. The Packet Start signal 417, in conjunction with the Data Clock signal 419, indicates the first byte of a packet 300. The data bus 201 is the same bus that is connected to the Output block 407. The Network Interface 105 is only able to input from or output to a single interface device at any given time. The Packet End signal 421 is generated by the Network Interface when it has received the last byte of the packet indicated by the Packet Length 303 contained in the packet header 315. This signal 421 is used by the interface devices to determine when additional bytes, such as signal strength information, are to be sent to the Network Interface 105.

Timing for the NI-Bus 101 signals can be found in FIGS. 11–17.

The Input block 405 can address up to 62 interface devices; however, the bus loading limit is 12. The interface devices include radio, LAN, and phone interfaces. Time is allocated during each frame via the NI Control Bus 203 to allow these devices to pass packets between one another.

The Output block 407 performs two major functions. First, it outputs packets from the Network Interface 105 to the interface devices on the NI Data Bus 201 at the proper time during a frame. Secondly, it outputs the control information on the NI Control Bus 203. The NI Control Bus 203 is an 8-bit wide bus at a maximum clock rate of 5 MHz. The Control Clock signal 427 indicates when the control bus 203 is stable, and the Data Clock 419 indicates when the data bus 201 is stable. The Output block 407 cycles through the Data and Control Buffers at the clock rate determined by the Clock Divisor in the NI Base Registers. The position in the Data Buffer is synchronized to the position in the frame via the Sync Offset in the NI Base Registers.

The NI-Bus Decode 409 listens to the addresses and commands on the NI-Bus 101. It decodes all commands that have a broadcast or Network Interface address. It provides control to the Input block 405 to tell it when to listen to the Data Bus 201 and to the Output block 407 to tell it when to drive the Data Bus 201. It also decodes the Skip N Clocks command for the Output block 407.

The Processor Interface block 207 provides the interface between the Control Processor 107 and the Network Interface 105. It also contains the NI Base Registers described in a later section. The Control Processor 107 has to read/write from/to the memory and registers in the Network Interface 105. The Processor Interface 207 allows the Control Processor 107 to access the memory/registers without slowing down the operation of the Network Interface 105. Zero to two wait states may be injected, via DTACK, due to the frequency of Control Processor 107 memory accesses allowed by the Network Interface 105. DTACK is generated for both read and write.

The network interface 105 will occupy a 64K byte space in the Control Processor 107's memory map. The NI Base Registers occupy address hex FC00 through hex FC17 in this space. The Processor Interface 207 will support both byte and word operations on the NI registers and memory. The NI Memory 111 is organized the same way as the 68000 memory.

The Network Interface 105 can interrupt the Control Processor 107 via the INT line. The INT line will be cleared when the Control Processor responds with an interrupt acknowledge, ITACK. The NI 105 has two sources of interrupts. The first is at the start of the frame, and the second is the reception of a packet destined for the Control Processor 107. These interrupts can be enabled and disabled by software.

The Network Interface 105 can be reset via a Reset Line from the Processor 107. This must be part of the power-up sequence. The end result of an NI reset is to guarantee the Control bus 203 will not output any commands. The reset is active low and must be low for at least 1 microsecond.

The definition of the signals contained in the processor interface 207 to the NI 105 can be found in FIGS. 11–16.

The Memory Access Control block 403 allocates the appropriate number of Network Interface Memory 111 accesses to the Input 405, Output 407, and Processor Interface 207 blocks. Each block requires a certain maximum number of memory accesses during a byte time (200 nanoseconds). Each block has its maximum number of memory accesses allocated to it every byte time.

The Memory block 111 provides all memory that is required by the Network Interface 105. It not only contains memory for the packets, but also memory for the registers that are required for routing and addressing in the Network Interface 105.

Refer to FIG. 5, which shows a memory map 500 of the memory 111. The memory 111 is divided into five sections: Virtual Circuit Registers 501, Address Registers 503, Processor Data 505, Control Buffer 509, and Data Buffer 507. The header 315 of the incoming packet 300 contains information that, when used in conjunction with the Virtual Circuit Registers and Address Registers, determines the route of the packet through the Network Interface 105. The standard packet 300 is shown in FIG. 3.

The Network Interface 105 can interrupt the Control Processor 107 via the INT line. The INT line will be cleared when the NI receives an interrupt acknowledge, ITACK. The NI can generate two types of interrupts. The first is one at the beginning of every frame. The second is when a packet is received destined for the Control Processor 107. Either one of these interrupts can be disabled by software via the Status/Control Register 900.

The Virtual Circuit Registers 501 are used with the Circuit ID field 301 of an incoming packet 300 to determine where in memory 111 the packet is to be stored. There are a total of 256 Circuit IDs, of which some are reserved for special packets such as reset, frame sync and control data. The Circuit ID 301 contained in the packet is used in conjunction with the Virtual Circuit Register Pointer in the NI Base Registers to determine the address of the Virtual Circuit Register. The contents of the Virtual Circuit Register is used to determine the routing and characteristics of the packet.

The next section of memory is the Address Registers 503. This section contains 128-bit registers. This allows a device to have multiple addresses of multiple types. The layout 600 of the Address Register Memory 503 is shown in FIG. 6. A device can have sixteen different addresses of varying types, and these addresses can change. 128 bits was chosen because of the requirement of a unique electronic serial number for each device.

An incoming packet 300 contains an Address Type 305, Address Length 307, and Address 309. The Address Type 305 is used in conjunction with the Address Register Pointer in the NI Base Registers to determine the address of the proper Address Register in memory. The Address Length 307 is used to determine how many bytes of the Address Register are read from memory. The bytes read from memory are then compared to the contents of the Address field 309 in the incoming packet. This determines if the packet is being sent to this device. Note that an address of zero length is always seen as a match, and thus represents an all call.

Referring again to FIG. 5, the Processor Data 505 section of memory provides storage for all incoming packets that are destined for the Control Processor 107. The management of this section of memory is more complex than the other sections. It is necessary to store multiple packets in this area of memory during a single frame. The types of packets stored in this section of memory are frame sync, control, casual data, and LAN data.

A circular buffer is used for the Processor Data section of memory 505. It is implemented using pointers in the NI Base Registers. A diagram 700 of the Processor Data 505 section of memory is shown in FIG. 7.

The organization of the packet storage in the Processor Data buffer is also shown in FIG. 7. The following is a list of the information stored in the buffer for each packet, and the order in which it is stored:

1. The number of bytes of additional information that are stored following the Info field of the packet. (1 byte)
2. The length of the Info field of the packet. (2 bytes)
3. The Info field of the packet. (0–2048 bytes)
4. The additional information bytes. (0–7 bytes)
5. The time stamp indicating the time in the frame when the first byte (Circuit ID) of the Packet Header was received. (2 bytes)

Four registers are defined in the NI Base Register for the Processor Data circular buffer. A diagram 800 of these registers can be found in FIG. 8. The Processor Data Start register contains the address of the first byte of the circular buffer. This register is written by the Control Processor 107 and read by the Network Interface 105. The Processor Data End register contains the address of the last byte of the circular buffer. This register is also written by the Control Processor and read by the Network Interface.

There are two additional registers for the circular buffer. The first is the Processor Data Read register. This register is used by the Control Processor to tell the Network Interface the address of the first byte of the next packet the Control Processor 107 will read. The Control Processor 107 only writes this register after it has read the complete packet. In other words, the Processor Data Read register will always point to the first byte of packet. The last register is the Processor Data Write register. This register is used by the Network Interface to point to the address that will be written into. It is written by the Network Interface 105 and read by the Control Processor 107.

The Network Interface 105 will check to determine if there is space in the buffer to write a packet before it is written. If there is not enough space, the packet will not be stored.

Referring again to FIG. 5, the Control Buffer 509 provides storage for the address/command bytes used to control the NI Data Bus 201. The address of the Control Buffer is determined by the Control Buffer Address Register in the NI Base Registers. The buffer is loaded with the appropriate address/command bytes by the Control Processor 107. It is accessed at the same rate as the clock for the output data on the NI Data Bus 201. The buffer is reset to its starting location, the address contained in the Control Buffer Address Register, at the same time as the Data Buffer is reset. This allows for synchronization between the Control and Data Buffers.

Referring still to FIG. 5, the last section of memory is the Data Buffer 507. The buffer contains the same number of bits as the frame. For a 1-millisecond frame at 40 Mbps, the Data Buffer contains 40,000 bits, or 5,000 bytes. The address of the Data Buffer is determined by the Data Buffer Address Register in the NI Base Registers, and the size by Data Buffer Size Register.

Packets are written into the Data Buffer 507 by the Input block 405 or the Control Processor 107. When a path (virtual circuit ID) is established, the Control Processor writes the packet header 315 into the Data Buffer 507. The Input block 405 will only transfer the info field 313 of the incoming packet 300. The Control Processor 107 writes the entire packet for control, casual, and LAN data.

The control processor 107 is responsible for initializing the Network Interface Base Registers, Virtual Circuit Registers, and the Address Registers. As routing changes, it has to update the Virtual Circuit Registers. It is also responsible for writing the packet header into the Data Buffer for all outgoing packets.

A set of registers is used to program the Network Interface 105. They control the addresses of the output buffer, address registers, and virtual circuit registers, the synchronization of the frame, the size of the output buffer, the speed of the output clock, and interrupts. The Network Interface Base Registers consist of twelve consecutive 16-bit registers located at hex addresses FC00 through FC17 in the NI memory space, but are not contained in the NI Memory. A diagram 800 of the registers is shown in FIG. 8.

The Status/Control Register 900 is shown in FIG. 9. The Status/Control Register 900 is used to enable interrupts and also to identify what type of interrupt has occurred. The register is read/write and is bits 0 through 7 of the first NI Base Register.

Referring now to FIG. 9, it is seen that bit 6 is used to enable the Packet Received interrupt 901. If bit 6 is set to a 1, an interrupt will occur when a packet is received and the Signal CP bit is set in the Virtual Circuit Register. Bit 7 is set to 1 when the entire packet has been received and the Signal CP bit is set in the Virtual Circuit Register. Bit 7 in the Status/Control Register 900 is cleared after being read by the CP.

Bit 4 is used to enable the Start of Frame interrupt. If bit 4 is set to a 1, an interrupt will occur when the NI 105 reaches the beginning of the frame. Bit 5 will be set to a 1 to indicate that the interrupt was caused by a Start of Frame. Bit 5 in the Status/Control Register 900 is cleared after being read by the CP.

Both the Packet Received and Start of Frame interrupts will be the same interrupt level to the Control Processor. The CP will have to read the Status/Control Register 900 to determine which caused the interrupt.

Bit 1 in the Status/Control Register 900 is used to reset the Network Interface 105. This is the same as a power-up reset. The end result of an NI reset is to guarantee the Control Bus 203 will not output any addresses. The NI can also be reset via a Reset Line from the Control Processor 107.

The CP writes a one to bit 0 in the Status/Control Register 900. This causes the NI 105 to reset and disable the Control Bus 203. The Control Bus 203 remains disabled until the CP 107 writes a zero to bit 0 in the Status/Control Register 900.

The Clock Divisor Register determines the bit rate of the output of the Network Interface 105. Bits 0 through 7 of the second NI Base Register contains the divisor of the output clock. The register is read/write. The Clock Divisor can be any value between 00000000 and 11111111. Table 1 contains preferred values for the clock divisor and the corresponding bit rate.

TABLE 1

Typical Clock Divisors

| Clock Divisor Value | Bit Rate |
|---|---|
| 00000001 | 40 Mbps |
| 00000010 | 20 Mbps |
| 00000100 | 10 Mbps |
| 00001000 | 5 Mbps |
| 00010000 | 2.5 Mbps |
| 00100000 | 1.25 Mbps |

The Sync Offset Register is used to synchronize the Data and Control Buffers to the system frame. Bits 0 through 12 of the third NI Base Register contain the Sync Offset and are read/write. A Frame Sync packet contains the position of the packet in the frame. When the packet 300 is received, the position in the Data Buffer 507 is stored with the packet. The Control Processor 107 compares the two values to determine if the Data Buffer is in sync with the frame. If not, the Control Processor 107 loads an offset value into the Sync Offset Register. This register is used to load the Data Buffer Counter at the end of the Data Buffer 507. After the Sync Offset Register is loaded into the Data Buffer Counter, it is cleared by the Network Interface.

The Data Buffer Size Register sets the size of the Data Buffer in bytes. Bits 0 through 12 of the fourth NI Base Register contain the Data Buffer Size and are read/write. The Data Buffer Size, in conjunction with the Clock Divisor, determines the length of the frame. Table 2 shows the preferred Output Buffer size for allowable frame sizes as a function of bit rate. The Data Buffer can be any size, and the maximum is determined by the available NI memory.

The Data Buffer Size is used to determine the end of the frame. The counter that is used to sequence through the Data Buffer is compared to the Data Buffer Size. When the counts are equal, the counter is loaded with the value in the Sync Offset Register, the Data Buffer Address is loaded into the counter used to address the Data Buffer, and the Control Buffer Address is loaded into the counter used to address the Control Buffer.

TABLE 2

Typical Data Buffer Size (bytes)

| Mbps | Frame Length (ms) | | |
|---|---|---|---|
| | 1 | 2 | 4 |
| 40 | 5000 | | |
| 20 | 2500 | 5000 | |
| 10 | 1250 | 2500 | 5000 |
| 5 | 625 | 1250 | 2500 |
| 2.5 | | 625 | 1250 |
| 1.25 | | | 625 |

The Control Buffer Address Register defines the starting location in the Network Interface memory of the Control Buffer. It is the fifth NI Base Register and is read/write. The Control Buffer Address Register is used to change Control Buffers.

The Data Buffer Address Register defines the starting location in the Network Interface memory of the Data Buffer. It is the sixth NI Base Register and is read/write. The Data Buffer Address Register is used to change Data Buffers. This register is used in conjunction with the Virtual Circuit Pointer Register to change the structure of the frame.

The Virtual Circuit Register Pointer defines the upper portion of the address for the Virtual Circuit Registers. It is bits 11 through 15 of the seventh NI Base Register and is read/write. It provides bits 11 through 15 of the address for the Virtual Circuit Registers' area of memory in the Network Interface memory. Bits 3 through 10 are provided by the Virtual Circuit ID in the incoming packet.

The Address Register Pointer defines the upper portion of the address for the Address Registers. It is bits 8 through 15 of the eighth NI Base Register and is read/write. It provides bits 8 through 15 of the address for the Address Registers' area of memory in the Network Interface memory. Bits 4 through 7 are provided by the Address Type field, and bits 0 through 3 are generated based on the value of the Address Length field in the incoming packet header.

The Processor Data Buffer Start register defines the start of the section of NI Memory that is used to store data that is destined for the Control Processor. It is bits 0 through 15 of the ninth NI Base Register and is read/write. The Processor Data area of NI Memory is a circular buffer, and this register defines the top of the buffer.

The Processor Data Buffer End register defines the end of the section of NI Memory that is used to store data that is destined for the Control Processor. It is bits 0 through 15 of the tenth NI Base Register and is read/write. The Processor Data area of NI Memory is a circular buffer, and this register defines the bottom of the buffer.

The Processor Data Read Pointer register defines the address of the next packet in the Processor Data area of NI Memory to be read by the Control Processor. It is bits 0 through 15 of the eleventh NI Base Register and is read/write. The Control Processor will write this address only after the packet has been completely read out of NI Memory. After a complete packet is read, the CP will write the address of the next packet into the Processor Data Read register. The address contained in the Processor Data Read register will always address the beginning of a packet in NI Memory.

The Processor Data Write Pointer register defines the next address in the Processor Data area of memory that will be written into by the Network Interface. It is bits 0 through 15 of the twelfth NI Base Register and is read only. The Network Interface updates this register as packets are written into the Processor Data area of NI Memory. The NI will check this register against the Processor Data Read Pointer register to prevent the information from being overwritten.

The parameters of the Virtual Circuit are contained in the Virtual Circuit Registers in the Network Interface Memory. There is a bank of 256 Virtual Circuit Registers arranged consecutively in memory addressed by a pointer in the NI Base Registers. The contents of the registers are shown in FIG. 9. The registers are used by the Circuit ID field of an incoming packet to determine where in memory the packet is to be stored, the maximum allowable packet length, how many bytes will be sent after the end of the packet, if the packet is destined for the Control Processor, and if the Control Processor is to be interrupted. There are a total of 256 Circuit IDs; some are reserved for special packets such as reset, frame sync, and control data. The Circuit ID contained in the packet is an offset to the address of the proper Virtual Circuit Register.

Referring now to FIG. 10, the Destination Address in the Virtual Circuit Register 1000 defines where in the Network Interface memory 111 the Info field 313 of incoming packet 300 will be stored. It is the first word in the Virtual Circuit Register 1000. The Destination Address is the address in NI memory 111 of the start of the storage area for a packet with a given Virtual Circuit ID.

The Maximum Packet Size field identifies the largest packet that will be transferred for a given Virtual Circuit ID. It is contained in bits 0 through 15 of the second word of the Virtual Circuit Register 1000. The Maximum Packet Size is used as a safeguard to keep a packet 300 from overwriting memory. If the Packet Length 303 is greater than the Maximum Packet Size, the Info field 313 of the packet 300 will not be stored, and the Network Interface will generate a Packet End signal 421. See the timing diagrams in FIGS. 11–17.

In order to keep an invalid Virtual Circuit ID from overwriting memory, the Maximum Packet Size for all unused Circuit IDs should be set to zero by the Control Processor 107.

The Additional Bytes Expected field defines the number of bytes that will follow the end of the information field 313 of the packet 300. It is contained in bits 0 through 2 of the third word of the Virtual Circuit Register 1000.

There can be zero to seven bytes following the info field 313. This information is sent immediately following the end of the packet 300. The NI-Bus 101 devices start sending the bytes, if any, after the Packet End line 421 goes from low to high. Packet End 421 will remain high until all additional bytes have been received or Packet Start 417 goes low. The device has to still generate the Data Clock signal 419 for each of the additional bytes. See the timing diagrams in FIGS. 11–17.

The Signal CP Flag is used to determine if a packet for a given Virtual Circuit ID should generate a signal to the processor 107. This is useful if the packet is being written into the Processor area of the Network Interface Memory 111. The flag is bit 3 of the third word of the Virtual Circuit Register 1000. If this bit is 1, bit 7 (901) of the Status/Control Register 900 will be set to a 1 when a packet is written into the processor area of the NI Memory 111. If bit 6 (903) of the Status/Control Register 900 is set to a 1, an interrupt will be generated to the Control Processor 107.

The CP Data Flag indicates if a packet with this Circuit ID is destined for the Control Processor 107. If the flag is One, the Info field 313 of the packet 300 will be written into the Processor area of the NI Memory 111, and the address contained in the Destination Address will be ignored. The flag is bit 4 of the third word of the Virtual Circuit Register 1000.

The Encryption Type field defines the type of encryption to be used for a given Virtual Circuit. The field is bits 5 and 6 of the third word in the Virtual Circuit Registers. Currently, the only encryption type that is defined is 00, which is no encryption. For the prototype, the Network Interface 105 will not be required to do anything with these bits.

The Network Interface Bus 101 (NI-Bus) Signals are described below.

The Data Bus 201 comprises 8 lines designated ND0 through ND7.—These 8 three-state, bi-directional lines are the path for transferring data between the Network Interface 105 and peripheral devices connected to the NI-Bus 101.

The Control Bus 203 comprises 8 lines designated NC0 through NC7—These 8 three-state output lines are for addressing/commanding devices connected to the NI-Bus 101.

The Control Clock (CCLK) line 427's output signal, when high, indicates that there is valid Control information on the Control Bus 203.

The Data Clock (DCLK) line 419's signal, when high, indicates that there is valid data on the NI Data Bus 201. The device driving the NI Data Bus 201 is responsible for driving this signal.

The Packet Start (PS) 417's input signal goes high and remains high while data is being sent from a peripheral device. The signal 417 will go low after Packet End 421 signal goes low. The device driving the Data Bus 201 drives the Packet Start signal 417.

The Packet End (PE) 421's output signal goes high to inform the peripheral device that all valid packet data has been received and that extra data bytes, if any exist, may be transmitted. The signal 421 goes low when all additional bytes have been received. The signal will go high if a Max Packet Size or CRC error occurs.

The Timing Specification is described as follows:
Refer to FIGS. 11–17.

FIG. 11 shows the network interface control transfer timing.

FIG. 12 shows the timing for a data transfer from a device to the network interface with no additional bytes.

FIG. 13 shows the timing for a data transfer from a device to the network interface with additional bytes.

Figure 14:
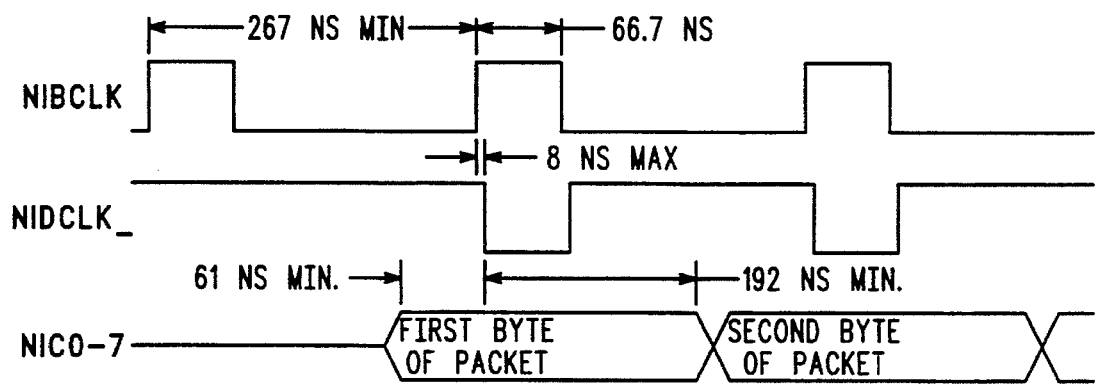
FIG. 14 is a timing diagram showing a data transfer from the network interface to a device.

FIG. 14 shows the timing for a data transfer from the network interface to a device.

Figure 15:
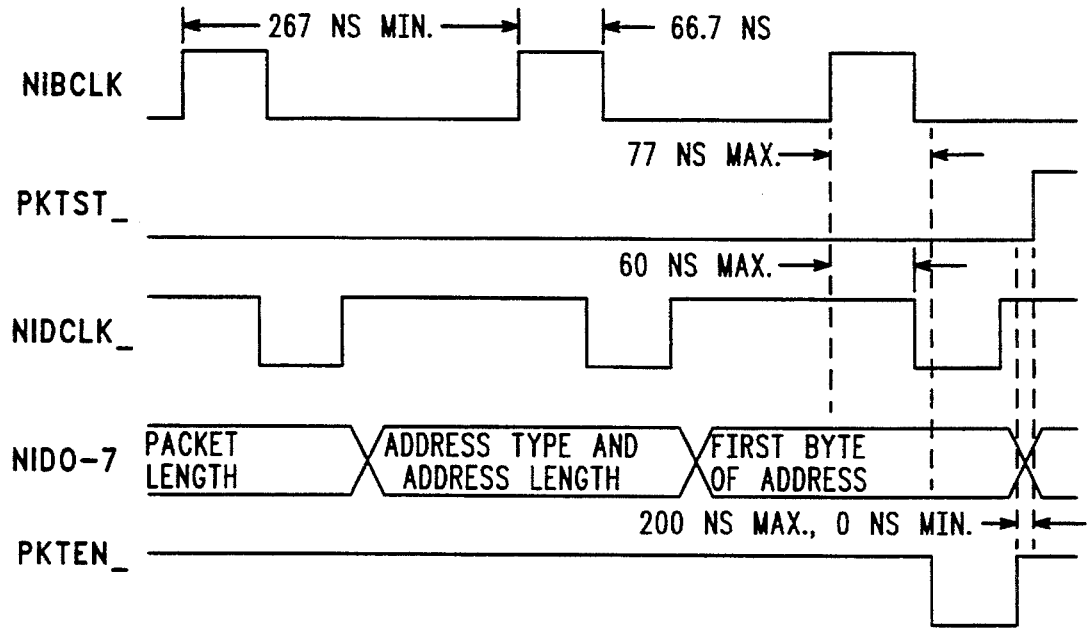
FIG. 15 is a timing diagram showing a data transfer from a device to the network interface with a maximum packet size error or a space available error.

FIG. 15 shows the timing for a data transfer from a device to the network interface with a maximum packet size error or a space available error.

Figure 16:
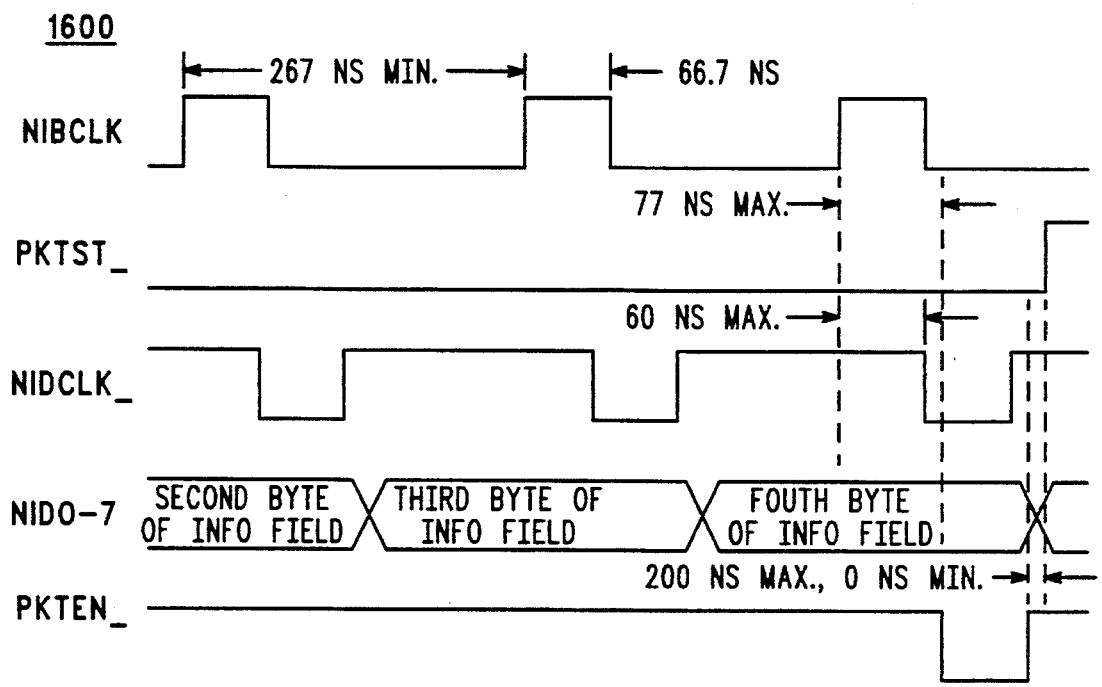
FIG. 16 is a timing diagram showing a data transfer from a device to the network interface with a CRC error.

FIG. 16 shows the timing for a data transfer from a device to the network interface with a CRC error.

Figure 17:
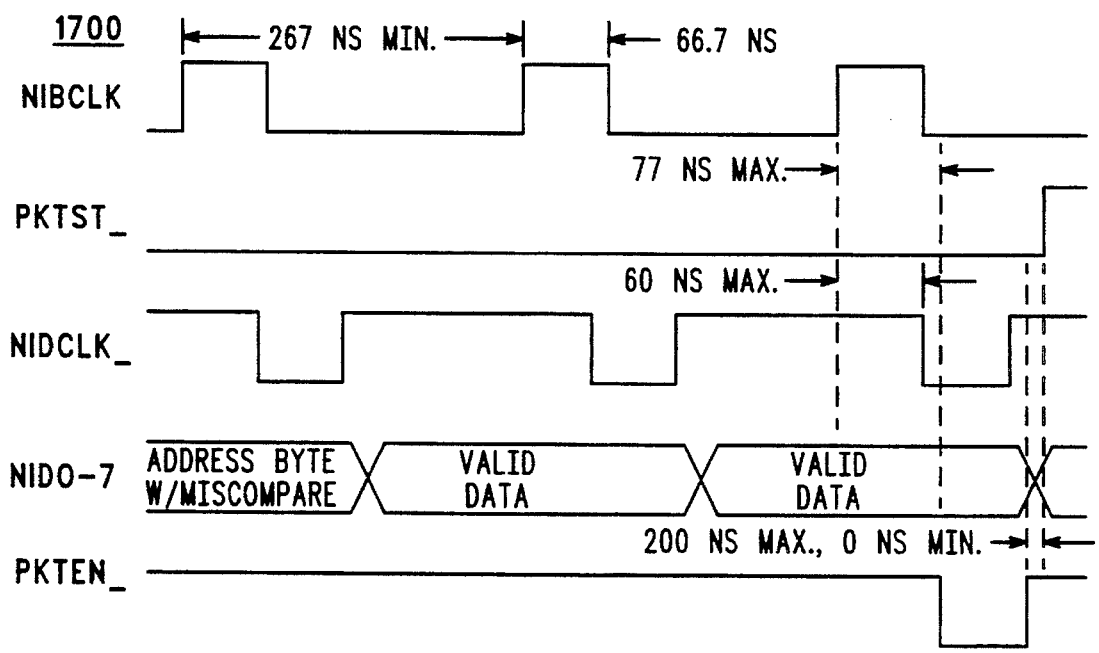
FIG. 17 is a timing diagram showing a data transfer from a device to the network interface with an address error.

FIG. 17 shows the timing for a data transfer from a device to the network interface with an address error.

The maximum rise and fall times for CCLK 427, DCLK 419, PS 417, and PE 421 are 5 nanoseconds. Rise and fall times are from 10% to 90%. All times are typical unless otherwise noted.

Figure 18:
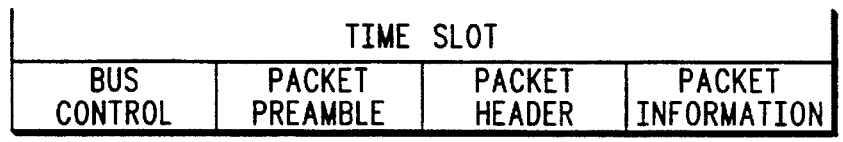
FIG. 18 illustrates a format for information in one time slot in a packet environment.

FIG. 18 illustrates a typical format for information being sent during one time slot on a packet bus. The format illustrates the transmission of local bus control information, packet preamble information, a packet header, and packet information (message data). The bus control information consists of the address of one of the interfaces coupled to the packet bus. The packet preamble is provided for synchronization purposes. The packet header will be explained in more detail below. The packet information represents the information to be communicated between users.

Figure 19:
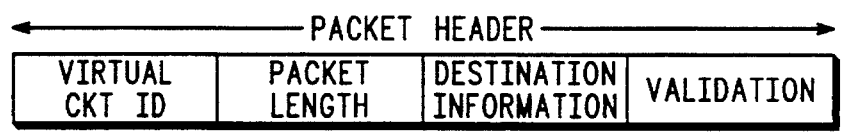
FIG. 19 illustrates the information contained in the packet header as shown in FIG. 18.

FIG. 19 illustrates information contained within the packet header as shown in FIG. 18 in accord with the present invention. The header includes a virtual circuit identification, packet length information, ultimate destination information, and validation information. The virtual circuit identification contains information that specifies a virtual circuit register contained within the network interface. Further information on this element is provided with regard to the following figures. The packet length provides information concerning the length of the associated packet. The destination information may include both destination and originating address information. The validation information contains data associated with a CRC data accuracy calculation.

Figure 20:
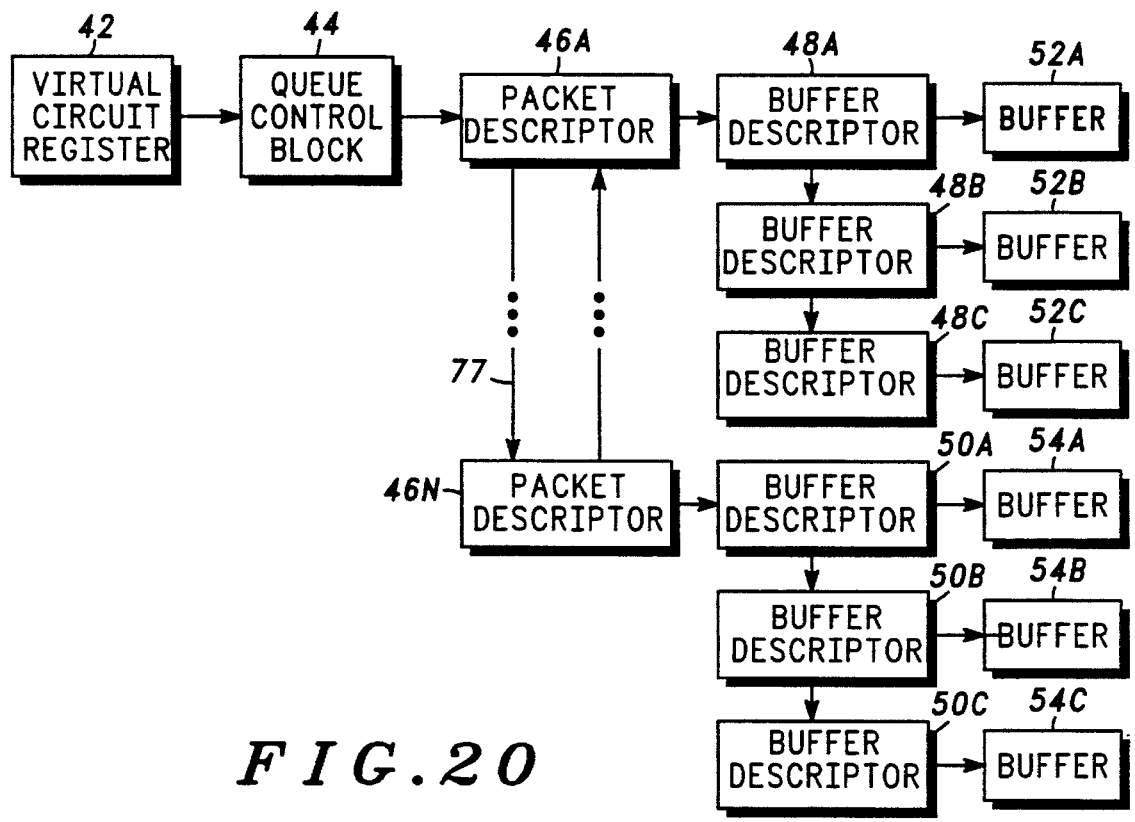
FIG. 20 is a diagram representing the packet addressing method and organization in accordance with the present invention.

FIG. 20 illustrates an exemplary packet handling and organization method according to the present invention. In the illustrative embodiment of the present invention, the packet information as identified in FIG. 18 is stored in buffers 52A–52C and 54A–54C. These buffers constitute sections of the data memory portion of memory 111. The control memory portion of memory 111 provides storage for the commands associated with the other elements shown in FIG. 20. These elements facilitate a method for organizing and reorganizing packets according to a hierarchical approach.

Virtual circuit register 42 points to or addresses a queue control block 44. Each queue control block can point to a write packet descriptor or a read packet descriptor. As illustrated, queue control block 44 points to packet descriptor 46A.

Each packet descriptor can point to a write buffer descriptor and a read buffer descriptor. In addition, it can point to one other packet descriptor. As illustrated, packet descriptor 46A points to buffer descriptor 48A and to packet descriptor 46N.

The buffer descriptors each point to one buffer and to a next write buffer descriptor and a next read buffer descriptor. In the illustrative embodiment, buffer descriptor 48A–48C point respectively to buffers 52A– 52C. Also the buffer descriptor 48A points to buffer descriptor 48B which in turn points to buffer descriptor 48C thereby forming a continuous chain or link. Buffer descriptors 50A–50C are likewise organized with regard to each other and buffers 54A–54C.

Before further explaining the functioning of these elements it is believed that an explanation of the benefits of this organization will assist in comprehending the organization and function of each element. An important aspect of this invention is to provide an improved level of flexibility in defining and redefining a packet without requiring substantial data duplication by a microprocessor. This is generally accomplished by providing a hierarchy of addressability wherein received packets are disassembled and stored in segregated memory locations. Packets to be transmitted are assembled by sequentially addressing the segregated memory locations.

Figure 21:
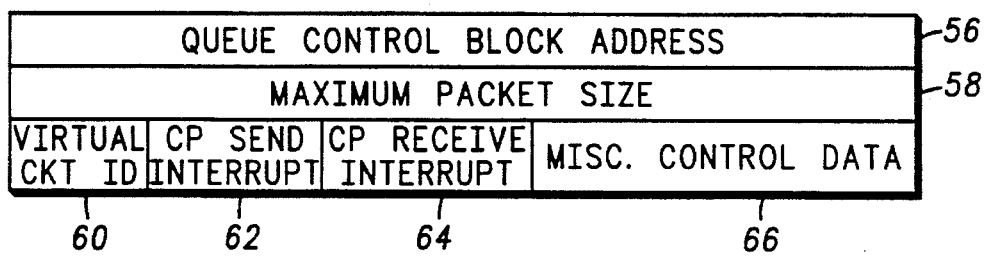
FIG. 21 illustrates the contents and format for the virtual circuit register as shown in FIG. 20.

FIG. 21 illustrates an exemplary embodiment of the contents of a virtual circuit register 42. As illustrated, it includes a queue control block address 56, maximum packet size information 58, virtual circuit type identifier 60, a central processor (CP) send interrupt data 62, CP receive interrupt data 64, and miscellaneous control data 66. Address 56 is utilized to point to the queue control block 44. The maximum packet size field identifies the largest packet that can be received for a given virtual circuit register. This can be utilized as a safeguard to keep a packet from over-writing memory. The virtual circuit type data indicates if the particular virtual circuit register is valid as an input or output circuit. The CP send and received interrupt fields determine if a CP interrupt is to be generated and if so, its priority. The miscellaneous control data field can be utilized to accommodate additional control information which may be useful for a specific implementation of a method in accordance with the present invention.

Figure 22:
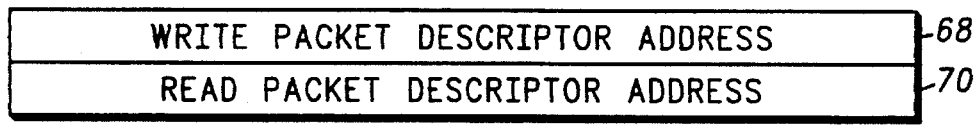
FIG. 22 shows the content and format of the queue control block as shown in FIG. 20.

FIG. 22 illustrates the fields associated with a queue control block 44. The queue control block consists of write and read packet descriptor address 68 and 70, respectively. The write packet descriptor address points to the packet descriptor to be used in writing a received packet. The read packet descriptor address points to the packet descriptor to be used in reading a packet to be transmitted. These addresses are updated as packets are received and transmitted.

Figure 23:
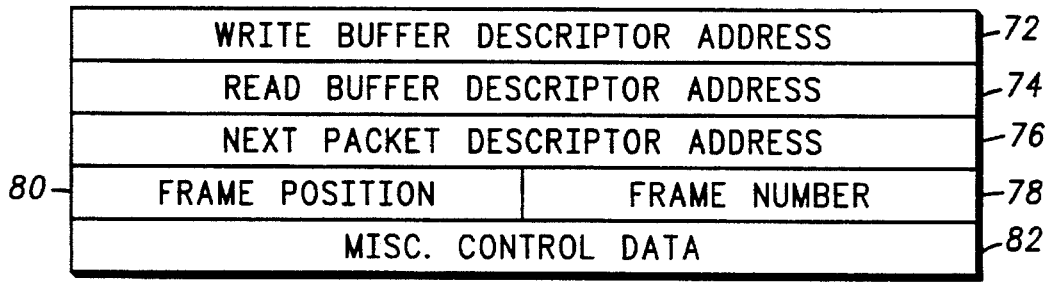
FIG. 23 shows the contents and format of a packet descriptor as shown in FIG. 20.

FIG. 23 illustrates the fields associated with packet descriptors 46. Each packet has one assigned packet descriptor that points to read and write buffer descriptors. The write buffer descriptor address 72 points to the first buffer descriptor to be used for receiving a packet. The read buffer descriptor address 74 points to the first buffer descriptor to be used for sending a packet. The next packet descriptor address 76 is used to point to the next packet descriptor in ring 77 (see FIG. 20). In the illustrated embodiment, packet descriptors 46A through 46N form a ring in which each points to the next, and wherein the last packet descriptor 46N points to the first or beginning packet descriptor 46A. It should also be noted that the packet descriptors are capable of pointing to any packet descriptor not merely the next adjacent packet descriptor in memory. Further, the ring could consist of but a single packet descriptor in which its next packet descriptor address points to its own address. The frame number field 78 indicates in which frame the packet was received. The frame position field 80 indicates the position in the frame of the start of the packet preamble. The miscellaneous control data field 82 can be utilized to store desirable data associated with the packet descriptor level to accommodate specific implementations.

Figure 24:
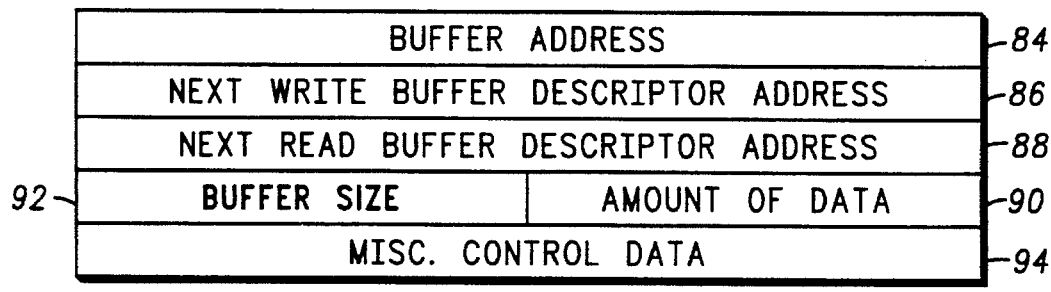
FIG. 24 shows the contents and format of a buffer descriptor as shown in FIG. 20.

FIG. 24 illustrates the fields constituting a buffer descriptor. The buffer address field 84 contains the address of the first byte in the buffer pointed to by the buffer descriptor. In the illustrated example, buffer descriptor 48A would contain a buffer address pointing to the first byte contained in buffer 52A. The next write buffer descriptor address field 86 is used to point to the next buffer descriptor to be used for writing a packet. Similarly, the next read buffer descriptor address field 88 is used to point to the next buffer descriptor to be used for reading a packet. The amount of data field 90 indicates the amount of the buffer that has been used. The buffer sized field 92 indicates the absolute size of the buffer. The miscellaneous control data field 94 may contain useful data associated with the the buffer descriptor level for a particular implementation. For example, the miscellaneous data field 94 may contain a flag which indicates the end of a packet.

The central processor is responsible for managing the virtual circuit registers, queue control blocks, packet descriptors, buffer descriptors and buffers. It will be apparent to those skilled in the art that there are many methods by which the central processor can manage the fields and memory associated with this organizational hierarchy for receiving, storing and retransmitting a packet. For example, the queue control block could be used to point to a fixed set of packet descriptors which in turn point to a fixed set of buffer descriptors. To add or delete packets from a queue, the write buffer descriptor address 72 (if packets are being received) or the read buffer descriptor address 74 (if packets are being transmitted) could be changed.

In another method, each packet could have a dedicated set of buffer descriptors which in turn has a dedicated packet descriptor. To add or delete packets from a queue, packet descriptors could be added or deleted from a packet descriptor ring by changing the next packet descriptor address 76 to point to packet descriptors in a desired sequence. These methods are illustrative only and indicate the great degree of flexibility with which the designer can control packet transmission in accordance with the method of the present invention.

Some of the further advantages of the method according to this invention are discussed as follows. Although the virtual circuit registers must each point to only one queue control block, a plurality of virtual circuit registers can point to the same queue control block. This may be desirable where a plurality of packets which are identical or contain substantial similarities are encountered. Differences between the packets could be stored in different buffers and the common contents of the packets stored in a common set of buffers. The CP could change the next read buffer descriptor addresses 88 accordingly to point to the proper sequence of buffers for the slightly different packets.

The read and write addresses in the queue control block allows the same virtual circuit register to be able to receive and transmit a packet. This conserves the number of virtual circuit registers required and minimizes repetitive data transfer between receive and transmit cycles.

Each packet descriptor defines a particular packet. An important aspect of the packet descriptors is the ability to point to a next packet descriptor via address 76 to form a circular ring of packet descriptors which point respectively to multiple packets. The size of the ring, i.e. the number of packets which can be consecutively identified, is limited only by the ultimate memory capacity available in the control memory and data memory. Since everything below the packet descriptor level is relevant to only one packet, the CP does not have to move redundant data in order to be able to retransmit the packet. This provides a substantial advantage especially when utilized in a packet repeater in which many if not all of the received packets must be retransmitted.

The buffer descriptors permit a plurality of fixed size buffers to be economically utilized. Since a plurality of buffers can be linked by means of the buffer descriptors, this permits common or repetitive information or control data to be stored in selected buffers and incorporated when needed by addressing the associated buffer descriptor and changing its next (write or read) buffer descriptor address as required. For example, a commonly used packet preamble consisting of synchronization data could be stored in one buffer or if too large for one buffer a series of linked buffers by associated buffer descriptors whereby the first associated buffer descriptor can be addressed and the next (write or read) buffer descriptor addressed changed for each new packet to be transmitted. This also provides the advantage of permanently storing certain information in buffers and allowing reuse of that information by directly reading it from the buffer at the appropriate sequence in later generated packets.

Figure 25:
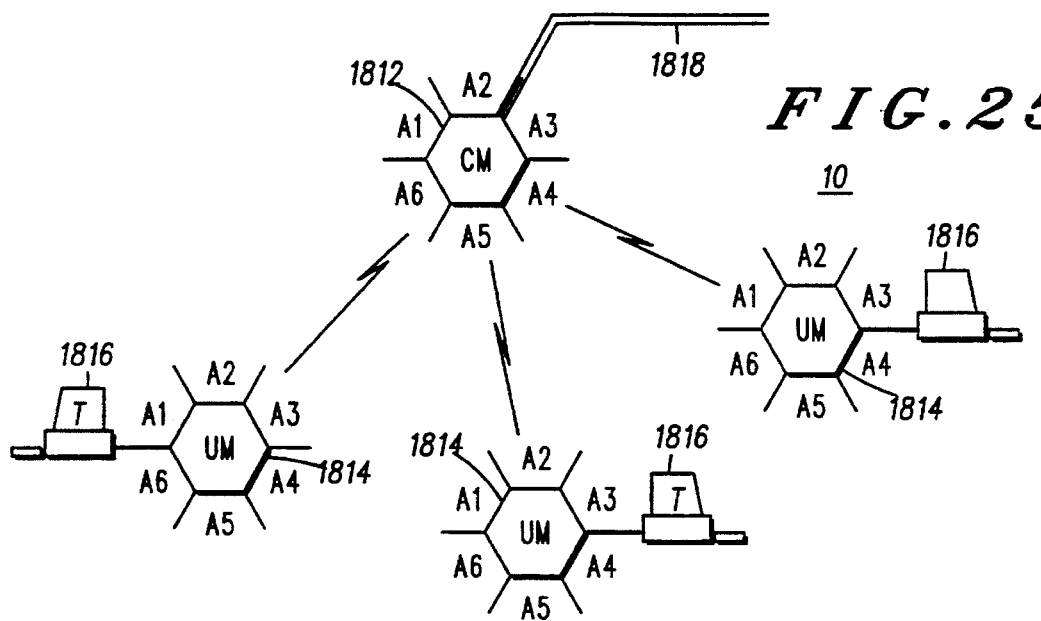
FIG. 25 is a diagram illustrating an exemplary wireless TDMA packet network incorporating the present invention.

FIG. 25 illustrates a wireless TDMA packet network embodying the present invention. A control module (CM) 1812 functions as a master node and communicates using radio frequency signalling with user modules (UM) 1814. Each UM is connected to one or more terminals 1816. Each terminal is representative of a communications device which utilizes digital signalling and may comprise a personal computer, computer peripherals, or video and audio equipment which converts images or sounds into digital data. The CM 1812 is preferably connected to a network such as Ethernet by a communication channel 1818 which may comprise coaxial cable or other means. In the illustrative embodiment, the CM and UM's communicate with each other using six directional antennas A1–A6 oriented to cover 360° in the horizontal plane. Depending on the positioning of the UMs relative to the CM, different antennas will likely provide the best communications path. It should also be noted that for such a network installed in a building, the direct communication path may not always be available because of objects or may change due to the movement of people. Thus, different antenna combinations will be utilized between a UM and the CM based on changes in the environment.

Figure 26:
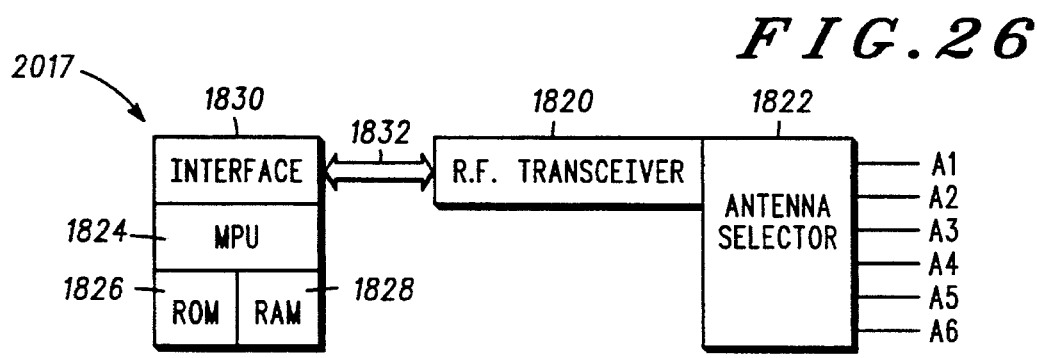
FIG. 26 is a block diagram illustrating control modules and user modules utilized in the packet system as shown in FIG. 25.

FIG. 26 illustrates a block diagram of a structure common to both the CM and UMs of FIG. 25. An RF transceiver 1820 utilizes digital data to modulate an RF carrier to transmit the desired data and its receiver converts received RF signals into corresponding digital data. Any one of antennas A1–A6 can be coupled to the transceiver 1820 by antenna selector 1822 which may comprise a conventional mechanical or electronic switching control. A microprocessor 1824 operates under the control of an operating system contained in read only memory 1826 and utilizes random access memory 1828. The microprocessor 1824 controls inbound and outbound data carried by path 1832, the transceiver 1820, and antenna selector 1822. An interface 1830 may consist of line drivers and input/output buffers and registers as is conventional in microprocessor systems. The path 1832 corresponds to communication channel 1818 where the embodiment is utilized as a CM and corresponds to the connection to a terminal 1816 where the embodiment is utilized as a UM. The microprocessor operation relating to synchronization is explained below.

The use of different directional antennas complicates the problem of maintaining relative time synchronization between each of the UMs and the CM. Since the UMs and CM each communicate using only one selected antenna at any given time, it cannot be assumed that each UM will receive synchronization signals or information transmitted by the CM using a particular CM antenna.

It is important that the UMs each remain in time synchronization relative to the CM so that each UM can receive transmissions addressed to it during a predetermined time slot in a frame and transmit information to the CM at a predetermined time slot. The lack of synchronization would result in multiple signal collisions and a resulting loss of data.

Figure 27:
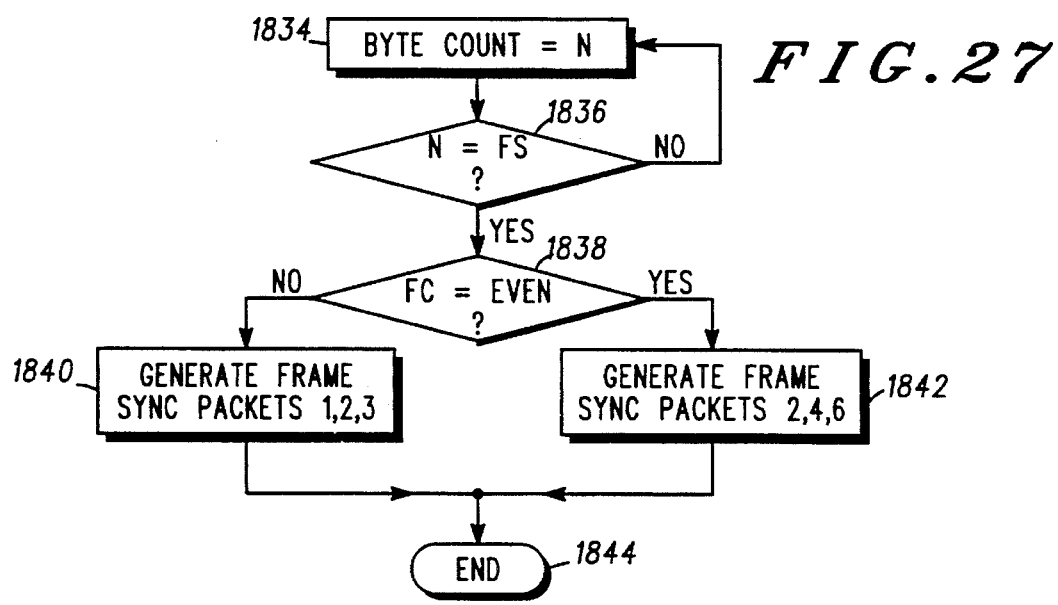
FIG. 27 is a flow diagram illustrating the generation of frame synchronization packets by the control module.

FIG. 27 illustrates a flow diagram utilized by the CM to generate frame synchronization packets that are transmitted over each CM antenna. Step 1834 represents a byte counter implemented in the microprocessor system which maintains a running count N of the number of bytes generated since the beginning of a frame. In step 1836 a decision is made as to whether the byte count N is equal to a predetermined frame sync number FS corresponding to the byte position relative to the start of the frame at which frame sync packets are transmitted by the CM. A NO determination results in returning to the byte counter and waiting until the FS byte is reached. Upon a YES determination, step 1838 makes the decision as to whether a frame count (FC) is even. The microprocessor contains a frame count register maintaining even/odd determination of consecutive numbered frames. A NO determination, corresponding to the frame count being odd, results in the transmission of frame sync packets over antennas A1, A3, and A5 by step 1840. A YES determination results in frame sync packets being transmitted over antennas A2, A4, and A6 by step 1842. Following the transmission of the frame syncs packets, this method ends at END 1844.

The CM does not transmit a frame sync packet over each antenna during each frame. In illustrative embodiment, half the frame synchronization packets are transmitted every other frame. This permits each frame to utilize three additional time slots for information or other purposes that would have otherwise been utilized if a frame sync packet was transmitted over each antenna during every frame. While one CM antenna will be preferable to the others for communications with a UM, it is likely that a UM may be able to receive signal transmissions over CM antennas adjacent the most preferred antenna. By selecting three CM antennas with maximum spacings (every other antenna) for the transmission of frame sync packets during each frame, it is likely that any given UM will be able to receive one of the frame sync packets. Each UM should receive a frame sync packet at least every other frame since it will be transmitted by the most favored CM antenna.

Figure 28A:
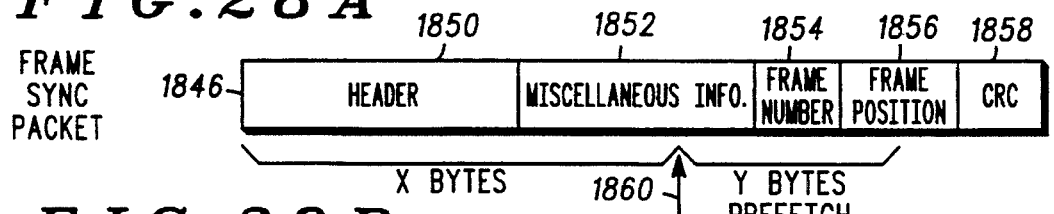
FIG. 28A illustrates the format of a frame synchronization packet generated by the control module.
Figure 28B:
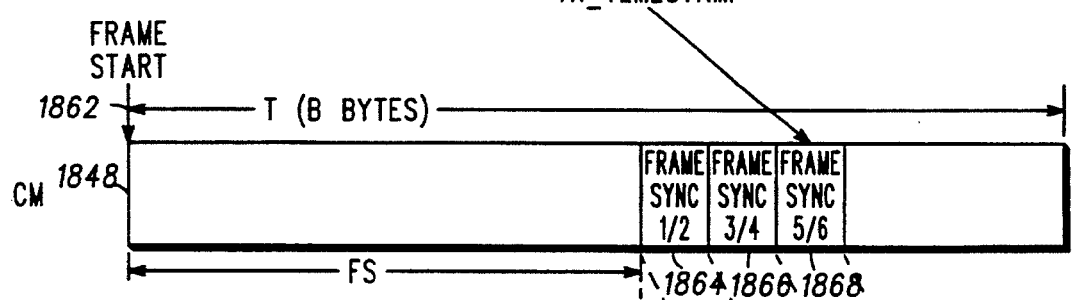
FIG. 28B illustrates the format of one frame as defined by the control module.

FIG. 28A illustrates the format of a frame sync packet 1846 as contained within a frame 1848 transmitted by the CM as shown in FIG. 28B. The synchronization packet 1846 preferably contains a header 1850, miscellaneous information and data 1852, the frame number 1854, the frame position 1856, and a cyclic redundancy calculation 1858 used for error checking. The frame position 1856 contains the frame position in bytes relative to the CM frame start 1862. The time stamp (TX_TIMESTAMP 1860) defined by the bytes in frame position 1856 actually reflects a time X bytes after the start of the packet 1846 since Y bytes of buffering are utilized prior to the actual transmission of each byte, i.e. Y bytes are prefetched in preparation for transmission of each byte. It is common in most systems for data to be retrieved and assembled a predetermined time before transmission.

In FIG. 28B, the CM frame 1848 illustrates three frame synchronization time slots 1864, 1866, and 1868. The remaining portion of the frame is divided into a plurality of time slots utilized for the transmission of information and data between the UMs and the CM. The frame start position 1862 marks the beginning of the frame having a predetermined time T which corresponds to a predetermined number of bytes B. Three frame sync packets are transmitted at these predetermined time slots relative to frame start 1862. In the illustrative embodiment, these frame sync packets will be transmitted by antennas A1, A3, and A5, respectively during an odd frame and during even frames these packets will be transmitted by antennas A2, A4, and A6 respectively.

Figure 28C:
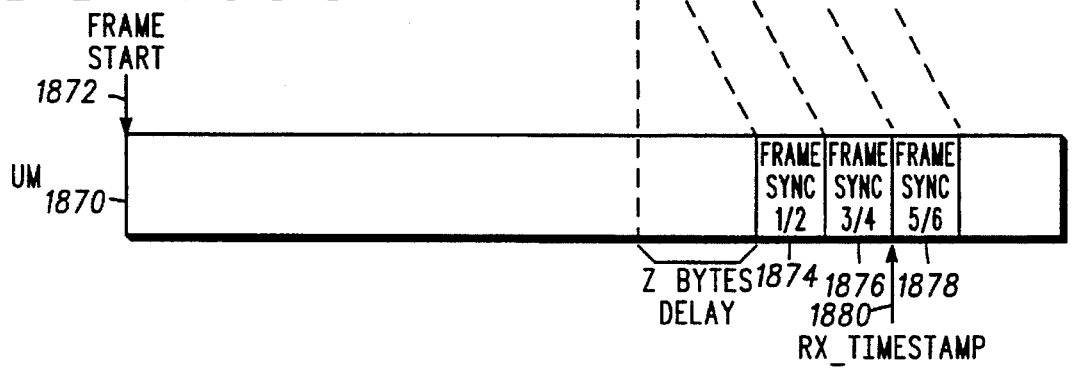
FIG. 28C illustrates the format of a frame as received by a user module.

FIG. 28C illustrates a UM frame 1870 having a frame start reference 1872 and including frame sync time slots 1874, 1876, and 1878 reserved for the reception of the frame sync packets. Frame 1870 is divided into a plurality of time slots corresponding to the same time slots defined by the CM frame 1848. A time stamp is provided at the reception of the first byte of each of the frame sync time packets. An RX_TIMESTAMP 1880 corresponds to the frame position in bytes relative to frame start 1872 when the first byte of the frame sync packet for slot 1878 was received. In the illustrative example it is assumed that frame sync packet 1846 transmitted in slot 1868 is received in slot 1878 and that frame sync packets transmitted in corresponding time slots 1874 and 1876 are not received. Because of inherent time delays introduced by the CM transmitter and the UM receiver, Z bytes of delay exist between the start time of slots 1868 and 1878 as shown in FIG. 28C.

Figure 29:
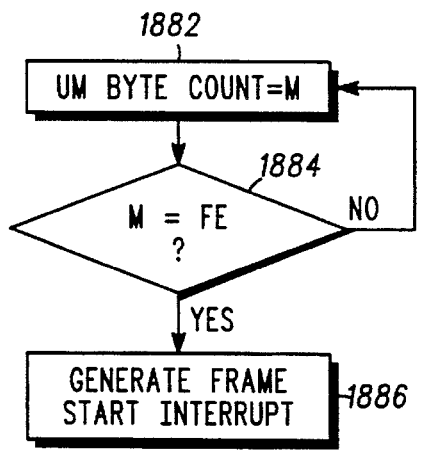
FIG. 29 is a flow diagram illustrating the generation of a frame start interrupt by a user module.

FIG. 29 illustrates a flow diagram by which each UM generates a frame start interrupt. In step 1882, the current byte count M relative to the beginning of a UM frame is maintained. In decision step 1884, a determination is made if the current byte count M=FE (frame end). A NO decision returns to step 1882 to await another byte count increment. A YES decision causes step 1886 to generate a frame start interrupt which marks the end of a preceding frame and the beginning of a new frame.

Figure 30:
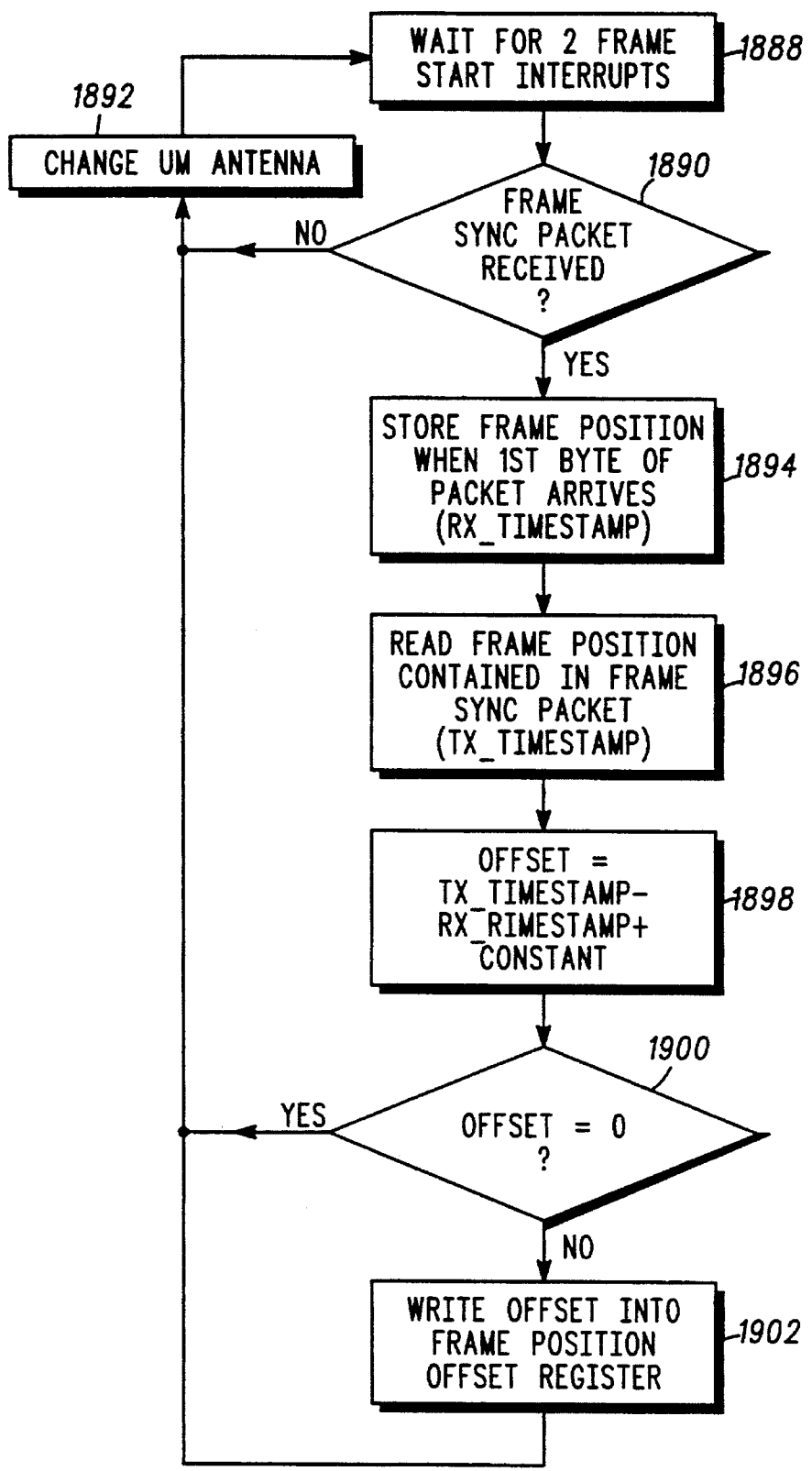
FIG. 30 is a flow diagram of the steps used in the user module for determining the frame time synchronization relative to the control module frame.

FIG. 30 is a flow diagram of steps taken by the UM to determine synchronization relative to the CM. In step 1888 the UM waits for two frame start interrupts to have occurred. Since the CM transmits a frame sync packet on each antenna during a two frame cycle, this waiting time allows the UM to attempt reception of each sync packet. In step 1890 a determination is made if a frame sync packet has been received. A NO determination causes step 1892 to change to a different UM antenna and return to step 1888 for the possible reception of a sync packet using the different receiving antenna. A YES determination by step 1890 results in step 1894 storing the frame position in bytes at the UM frame when the first byte of a frame sync packet arrives. This position corresponds to RX_TIMESTAMP 1880. In step 1896 the frame position contained in the frame sync packet, TX_TIMESTAMP, is read. In step 1898 a calculation is made to determine the OFFSET, if any, of the UM frame relative to the CM frame. In this calculation, OFFSET= TX_TIMESTAMP minus RX_TIMESTAMP plus CONSTANT. The CONSTANT is the difference between RX_TIMESTAMP and TX_TIMESTAMP when the CM and UM frames are in perfect time synchronization. The CONSTANT (delay value) consists of the number of bytes of delay introduced by the CM transmitter and UM receiver minus the X byte difference in the recording of the TX_TIMESTAMP relative to the RX_TIMESTAMP. In step 1900 the determination is made if OFFSET=zero. If YES (no adjustment to UM synchronization is needed), the UM antenna is changed at step 1892 and control passes to step 1888. A NO determination (a synchronization adjustment is required), results in step 1902 writing the OFFSET value into a frame position OFFSET register contained in interface 1830 in the UM. Following step 1902, step 1892 is executed and the cycle returns to beginning step 1888. Thus, the UM makes a synchronization adjustment determination and provides the compensation value OFFSET in a register which is utilized as will be explained in regard to FIG. 31. It should be noted that step 1892 could be skipped following steps 1900 and 1902 since a frame sync packet was received. However, the UM antenna is changed in the preferred embodiment after each cycle shown in FIG. 30 to permit an antenna evaluation algorithm to continuously evaluate the best UM antenna for communication with the CM.

Figure 31:
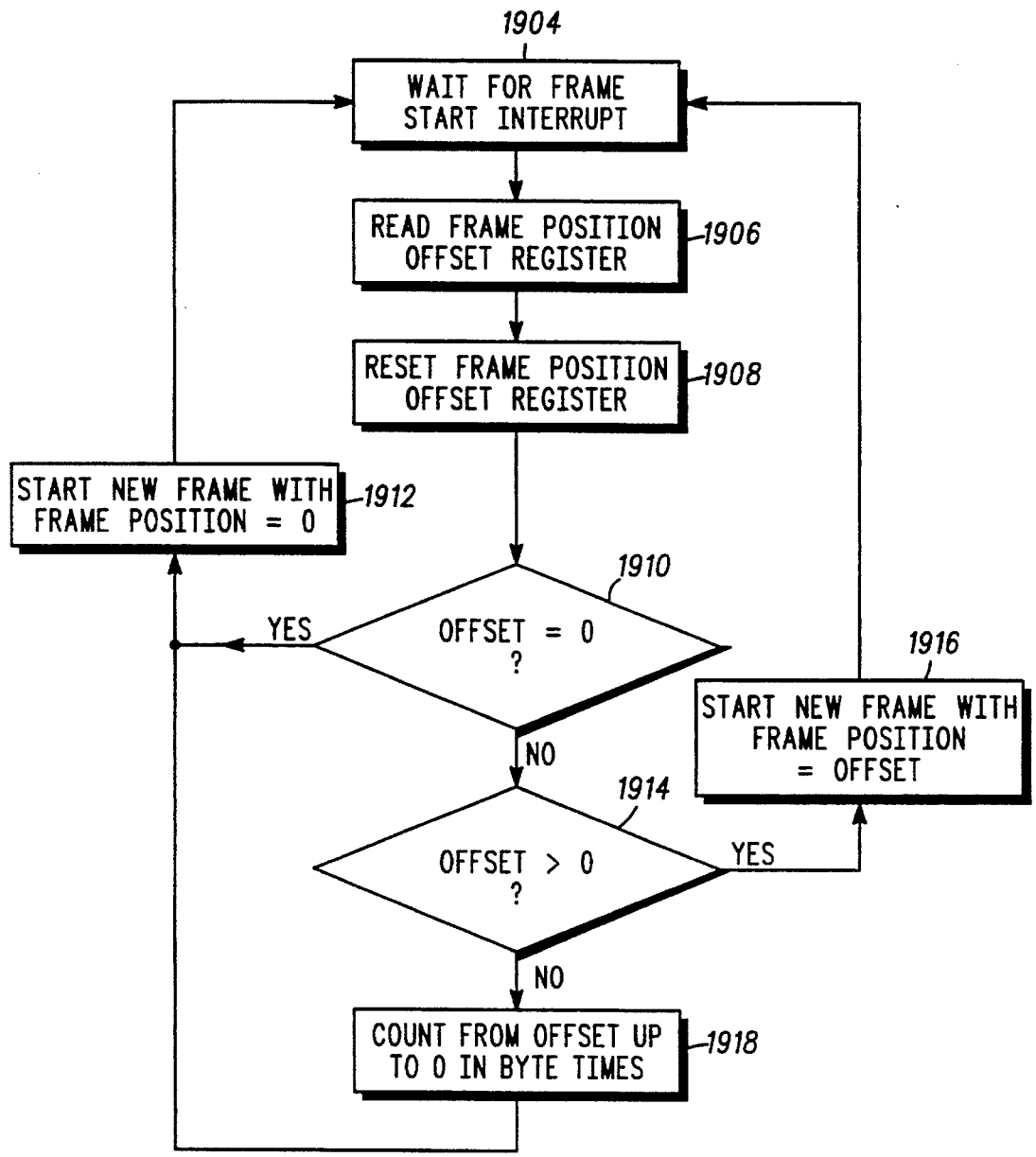
FIG. 31 is a flow diagram of the steps taken by the user module for adjusting a received frame to maintain time synchronization with the control module frame.

FIG. 31 illustrates the steps in a method implemented by the microprocessor of the UM. In step 1904 the UM waits for a frame start interrupt generated by step 1886. Upon receiving the frame start interrupt, step 1906 causes the frame position offset register to be read. In step 1908, the frame position offset register is reset to zero. In step 1910 a determination is made if the offset is equal to zero, i.e. the value which was written into the frame offset register. A YES determination results in step 1912 causing the new UM frame to start the frame position with a zero byte count in the offset register, i.e. no shift, and a return to step 1904. A NO determination results in step 1914 making a further determination as to whether OFFSET was greater than zero. A YES determination results in step 1916 causing the UM byte count to start with a frame position equal to OFFSET, i.e. the new frame starts from a count equal to OFFSET which will have the effect of advancing the UM frame in time relative to the CM frame. Following step 1916, a return is made to step 1904. A NO determination by step 1914 (which corresponds to offset having a negative integer value), results in step 1918 causing the UM frame byte counter to count from offset up to zero. This has the effect of delaying the UM frame relative to the CM frame. Following this additional delay, the frame continues at the zero byte count and counts towards the predetermined number of bytes contained within a normal UM frame by step 1912. Thus, the UM frame is adjusted in time relative to the CM frame.

In the preferred embodiment of the invention, each CM and UM frame contains a first time slot having a predetermined number of expendable bytes which are not allocated for data or message information. This enables these bytes at the beginning of the frame to be lost without the loss of frame information when the UM frame count starts at a number greater than zero. The number of expendable bytes is preferably set large enough to accommodate the typical positive offsets which may be utilized in maintaining synchronization.

It will be apparent to those having ordinary skill in the art that the CM and each UM will contain an independent clock oscillator such as controlled by a crystal for generating timing. Therefore, the rate of frequency (time) change between clocks in the CM and each UM will normally be small and will result in the UMs requiring OFFSET adjustment by only one byte once in a substantial number of frames. Thus, even if a frame sync packet is not received for several frames, synchronization will not be lost.

An advantage of the synchronization method and apparatus according to the present invention resides in the distributed nature of the adjustments in which each UM is free to make an independent adjustment relative to the CM. Not only does this maintain system synchronization of the UMs relative to each other, but it also relieves the CM of the task of calculating synchronization adjustments for the different UMs.

Another advantage of the present invention is that additional time slots are available in each frame which would have been occupied by frame sync packets if a sync packet was transmitted on each antenna during each frame. Instead of transmitting three sync packets each frame, two sync packets could be transmitted each frame thereby requiring a total of three frames to complete the transmission over each antenna. In this case sync packets would preferably be grouped corresponding to antennas A1, A4; A2, A5; A3, A6 so that at least one sync packet is transmitted in each 180° horizontal plane during each frame to enhance the possibility that one will be received as soon as possible in the 3 frame sequence.

Figure 32:
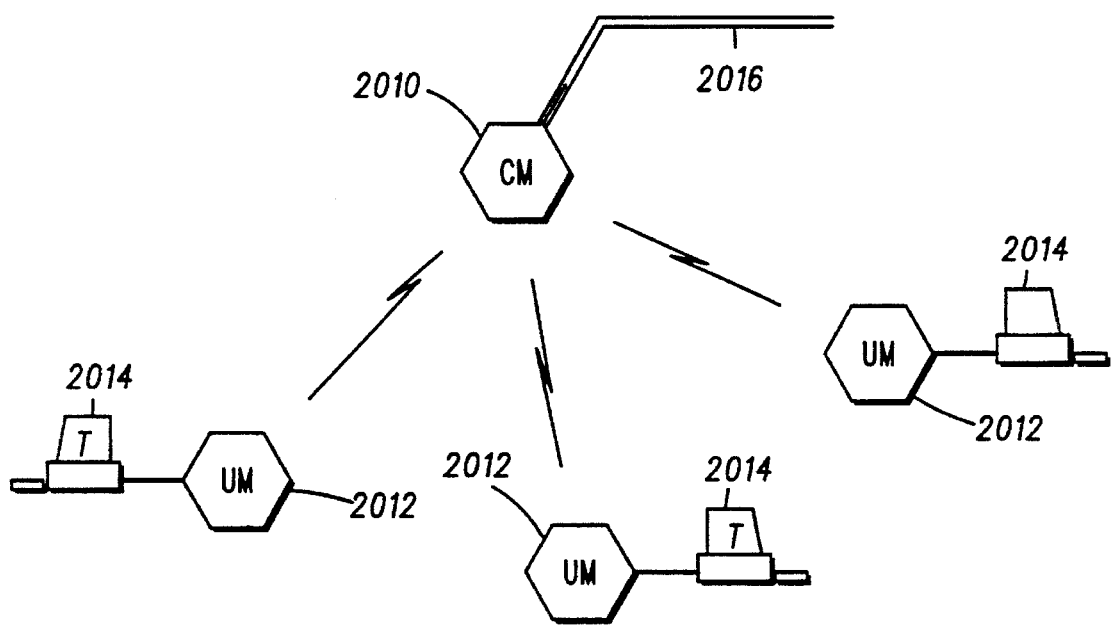
FIG. 32 illustrates a wireless packet communication system suited for incorporating the present invention.

FIG. 32 illustrates a wireless packet communication system in which a control module 2010 utilizes RF communications to communicate with user modules 2012 that are each coupled to one or more user devices 2014 consisting of a terminal, personal computer, telephone, or other information input/output device. In the illustrative system, the control module 2010 is also coupled by a data channel 2016 to a data network. The control module controls communications within the illustrated network and passes information from the data network via channel 2016 to user devices 2014 via the associated user module. The control module also controls local communications by receiving information from one user module and relaying the information to a different user module. The wireless information is conveyed in the form of packets. The data network to which control module 2010 is connected may consist of an Ethernet network.

Figure 33:
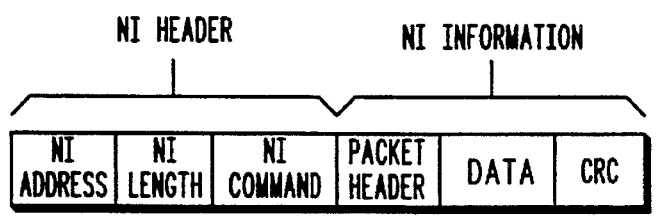
FIG. 33 illustrates a packet format utilized in a preferred embodiment of the present invention.

FIG. 33 illustrates a preferred embodiment of a packet format utilized for communications over the NI bus. It is segmented to contain a NI header, a packet header, a data information portion, and a cyclic redundancy calculation field for error checking. The NI header includes a NI address, i.e. the address of a peripheral device connected to the NI bus, a field indicating the length of any NI information, and NI information which may consist of commands. The NI header is used by the communication controller in transmitting packets to the NI peripheral devices. A NI header is not utilized when a peripheral device transmits packets on the NI bus since all such packets are only received by the communication controller.

The methods described below will most advantageously be integrated into a conventional software operating system that provides various operational capabilities dependent upon the specific operating environment.

Figure 34:
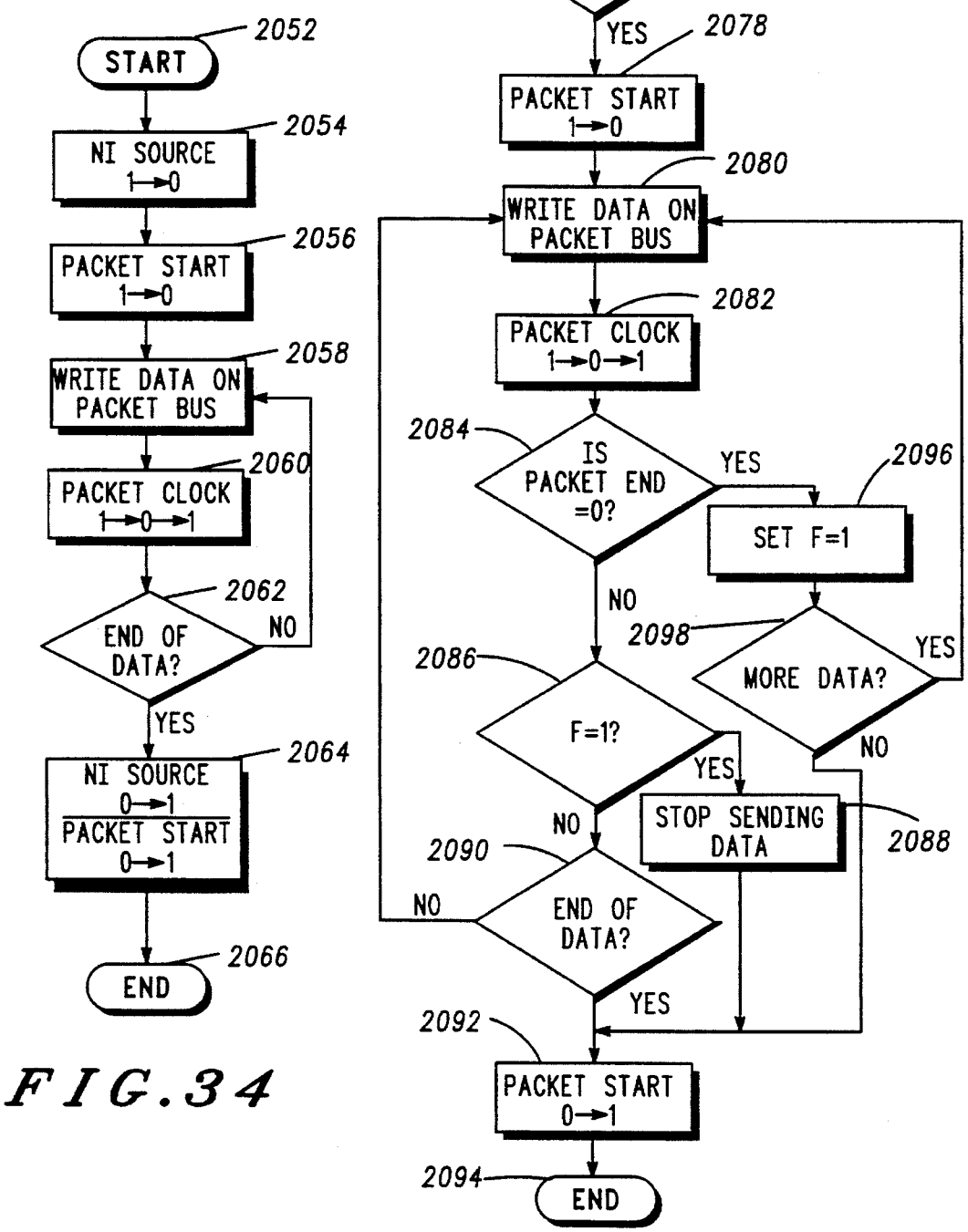
FIG. 34 is a flow diagram illustrating the transmission of data from a communication controller to a peripheral device.
Figure 35:
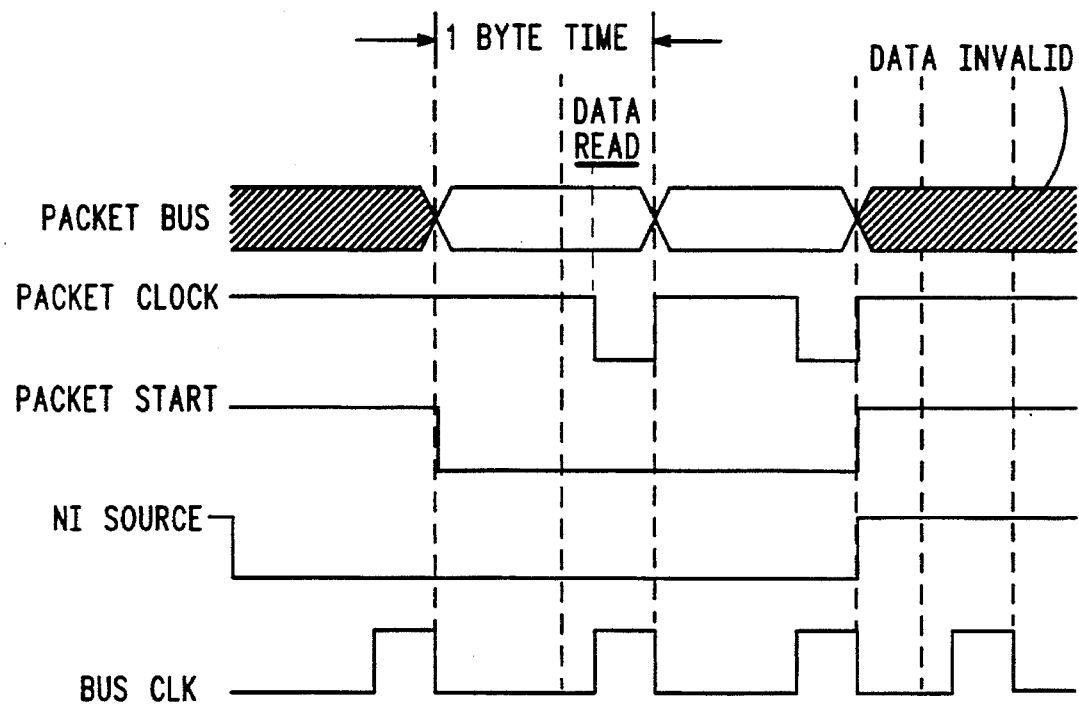
FIG. 35 is a timing diagram illustrating control signals utilized in accordance with the flow diagram of FIG. 34.

FIG. 34 is a flow diagram illustrating the steps implemented by the communications controller to transmit data or commands to a peripheral connected to the NI bus. The timing diagram illustrated in FIG. 35 also relates to the transmission of packets of data from the communications controller to the peripherals and should be read in conjunction with the steps described in FIG. 34. The timing diagram in FIG. 35 represents the physical NI bus which consists of a packet bus having a plurality of lines for conveying a byte of data during each bus clock cycle and separate control lines for packet clock, packet start, NI source, and bus clock. The NI source and bus clock lines are always controlled by the communications controller; the remaining lines and packet bus are bi-directional, i.e. the communications controller and the peripherals are capable of writing to and reading these lines.

The transmission of data from the communications controller to a peripheral is accomplished as follows. Beginning with entry at START 2052, the controller drives the NI source line from high to low as indicated in step 2054. This gives the controller control of the NI bus and communicates to all peripherals that they are to receive data which will be transmitted from the controller. In step 2056 the controller drives the packet start line from high to low which marks the beginning of the transmission of a packet to be transmitted by the controller to a peripheral. Next, the controller writes a byte of data on the packet bus as indicated by step 2058. In step 2060, the controller drives the packet clock line from high to low and back high. The peripherals read the data written on the packet bus during the high to low transition of the packet clock. In decision step 2052 the controller determines if all data has been transmitted. If NO, the next byte of data is written on the packet bus by returning to step 2058 and the cycle repeated. Upon completing the writing of all data (step 2062=YES) the controller drives the NI source line from low to high releasing control of the NI bus and packet start from low to high marking the end of the packet in step 2064. This method terminates at END 2066.

In the illustrative example as shown in FIGS. 34 and 35, the communications controller sent a single packet as illustrated in FIG. 33 to one or a predetermined group of peripherals. The NI header contains the peripheral address of a particular peripheral or a group address for a predetermined group of peripherals. After receiving and decoding the peripheral address contained in the NI header, each peripheral can determine if the following information is intended for it. If the information is intended for a peripheral, then it will continue reading the data transmitted by the controller. If the packet is not intended for a peripheral, then it need not further process the information and can merely look for a low to high transition of the packet start line indicating the end of transmission of that packet. Although the illustrative example indicated the simultaneous transition of NI source and packet start in step 2064, the controller may alternatively maintain the NI source line low, indicate the end of the packet transmission by driving the packet start line from low to high and then begin transmission of another packet by driving packet start from high to low thereby not relinquishing control of the NI bus between the transmission of successive packets. The packet clock line is controlled by the transmitting device with the high to low transition being a signal to the receiving device that data on the packet bus is stable and should be read.

Figure 36:
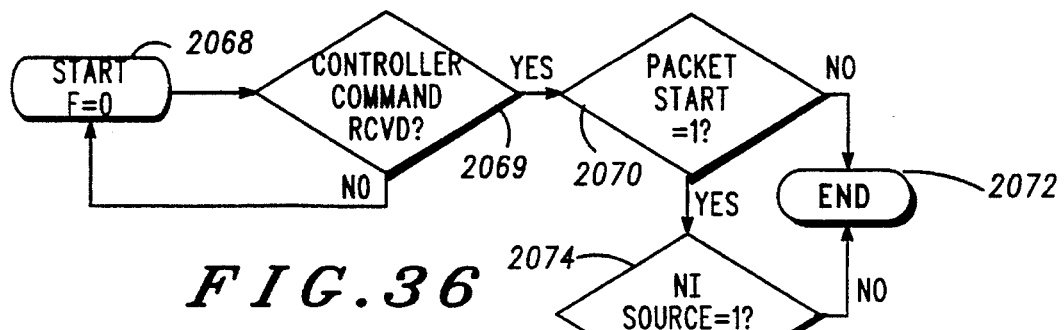
FIG. 36 is a flow diagram illustrating the transmission of data from a peripheral device to the communication controller.
Figure 37:
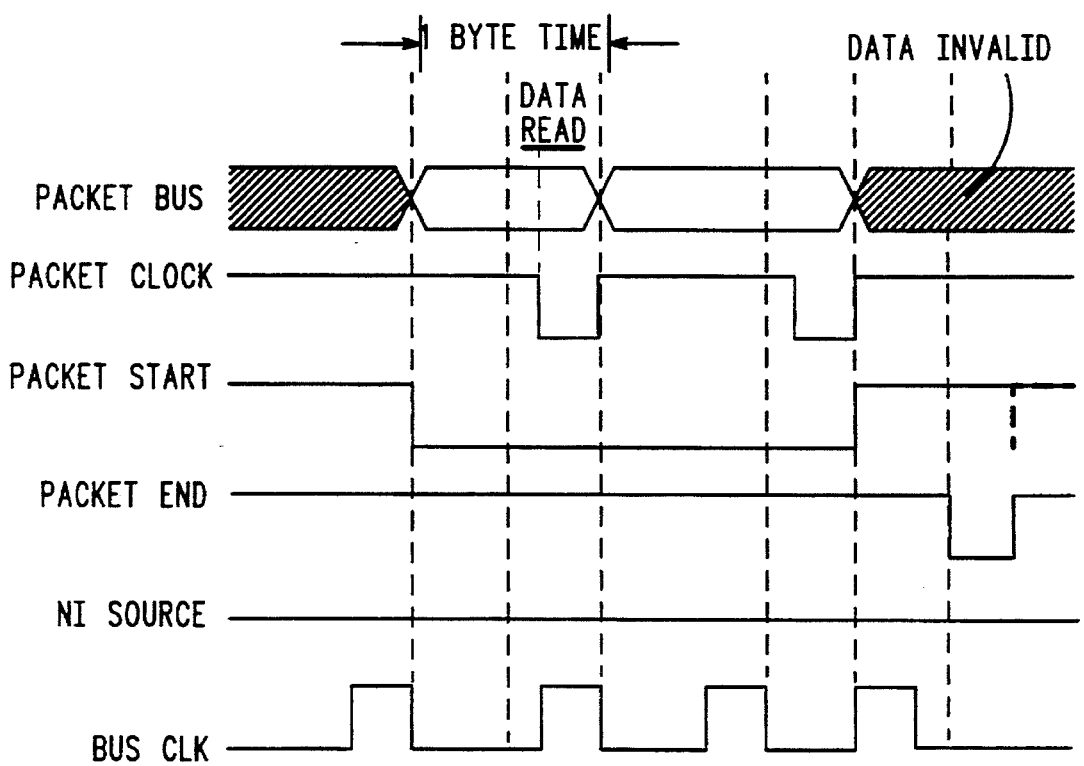
FIG. 37 is a timing diagram illustrating controls utilized to transmit information in accordance with the steps of FIG. 36.

FIG. 36 shows a flow diagram illustrating steps performed by a peripheral device in transmitting data to the communications controller. These steps should be read in conjunction with the timing diagram shown in FIG. 37. The timing diagram in FIG. 37 illustrates one additional control line, packet end, not shown in FIG. 35. In the preceding description relating to FIG. 35, the packet bus, packet clock, and packet start lines were sourced by the communications controller. With regard to FIG. 37, the packet bus, packet clock, and packet start lines are sourced by a peripheral. The packet end, NI source, and bus clock are sourced by the controller.

In START step 2068, a flag (F) is set to zero. This flag generally relates to the ability of the controller to allow certain additional data to be transmitted after the end of the packet as marked by packet start. The operation of this flag is explained in detail below. In step 2070, a determination is made if packet start is high. A NO decision results in the termination of the method at END 2072 since packet start must be high in order for a peripheral to initiate data transmission. Following a YES decision by step 2070, step 2074 determines if NI source is high. A NO decision by step 2074 results in a further decision by step 2076 in which a determination is made by the peripheral if it has been instructed by a command from the controller on the packet bus to transmit data. A NO determination by step 2076 results in termination at END 2072 since a peripheral will not normally be able to transmit data when the NI source line is low except upon being instructed by a prior command send by the controller on the packet bus. A YES decision by step 2074 indicates that the NI bus is available for data transmission by the peripheral.

In step 2078 the peripheral drives packet start line from high to low thereby advising the controller to receive data. The peripheral then proceeds to write data on the packet bus in step 2080. The peripheral then drives the packet clock line from high to low which provides a timing signal to the controller to read the data on the packet bus. In step 2084 a decision is made if packet end is low. The packet end line is controlled by the controller and is utilized to provide an override control which can be exercised by the controller to prematurely terminate transmission by a peripheral. A NO decision in step 2084 leads to a determination in step 2086 if flag F is high. A YES decision results in the peripheral initiating a stop sending data sequence 2088 in which transmission of data is stopped. A NO determination by step 2086, i.e. the flag is not set, results in a determination by the peripheral as to whether all data has been transmitted in step 2090. A NO decision returns control to step 2080 in which additional data is transmitted to the controller. A YES determination by step 2090, indicating the end of desired data transmission by the peripheral, results in the peripheral driving the packet start from low to high as indicated in step 2092. This tells the controller that the peripheral has finished transmitting the packet. Following step 2092 the method terminates at END 2094.

The following explanation indicates the ability of the controller to prematurely end the transmission of data by the peripheral. This sequence is initiated by the controller driving packet end line low, a YES decision by step 2084. In step 2096 the peripheral responds to this command by setting flag equal to 1. In step 2098 a determination is made by the peripheral if more data remains to be sent to the controller. A NO decision results in terminating the transmission by return to steps 2092 and 2094. A YES determination by step 2098, indicating that more data is to be sent, causes a return to step 2080 in which the next byte of data is written to the packet bus and the packet clock is incremented in step 2082.

If the packet end line remains low as determined by step 2084 the same sequence of steps will proceed until the peripheral has transmitted all of its data as determined by step 2098. However, if the controller has caused the flag F to be reset by driving packet end from low to high, a NO determination will be made by step 2084. In this case, step 2086 will result in a YES determination since the flag has been set thereby implementing the immediate stop function by step 2088. Thus, the controller can terminate the transmission of data by a peripheral by driving packet end from high to low to high.

In the illustrative example as shown in FIG. 37, the packet start line is driven by the peripheral from low to high prior to a packet end line termination command, i.e. from high to low to high. Thus, this example illustrates that the peripheral completed the transmission of its data without a premature interruption by the controller. The heavy dashed line associated with the packet start line in FIG. 37 illustrates an alternative example in which the peripheral continued to have data to send but was interrupted by the packet end command, whereby the packet start line remains low until the beginning of the heavy dashed line and returns high concurrent with the packet end line being driven from low to high by the controller. This mechanism is advantageous in that it permits the possibility of additional bytes of data to be transmitted beyond a predefined packet as determined by the packet start line. Thus it is possible for a peripheral to immediately send a number of bytes of additional information following a packet. Such bytes of information can be utilized to monitor conditions of the peripheral or may correspond to general update information provided by the peripheral following the transmission of the packet. This permits such information to be communicated without requiring it being carried within a packet. This provides additional flexibility of communications which is especially advantageous when a plurality of peripherals each communicate with a common controller.

If one peripheral is transmitting a packet of information which is destined for another peripheral attached to the NI bus, the controller will process the packet and reformat a packet with a NI header addressed to the destination peripheral and transmit it over the NI bus. Thus, the communications controller acts as a traffic cop in routing packets and information between peripherals as well as providing a common point of coordination of communications.

While various embodiments of the invention have been described and shown herein, the scope of the invention is defined by the following claims.

We claim:

1. A wireless in-building telecommunications system for voice and data communications comprising:

a control module;

a plurality of user modules;

said control module having a voice interface device coupled to a public switched telephone network (PSTN) for coupling voice signals to the public switched telephone network (PSTN), and a plurality of data interface devices coupled to respective digital information sources for coupling data signals to the respective digital information sources;

said plurality of user modules having a voice interface device coupled to a telephone instrument for coupling voice signals to the telephone instrument, and a plurality of data interface devices coupled to respective digital information terminals for coupling data signals to the respective digital information terminals;

said control module having a packet switch coupled to said voice interface device and said plurality of data interface devices via a network interface bus, at least one of said data interface devices coupled to a radio which communicates with said plurality of user modules via a shared RF communications channel;

said plurality of user modules having a packet switch coupled to said voice interface device and said plurality of data interface devices via a network interface bus, at least one of said data interface devices coupled to a radio which communicates with said control module via said shared RF communications channel.

2. The wireless in-building telecommunications system of claim 1 wherein said digital information sources are selected from the group consisting of: Ethernet local area networks and Token Ring local area networks.

3. The wireless in-building telecommunications system of claim 1 wherein said digital information sources comprise a computer.

4. The wireless in-building telecommunications system of claim 1 wherein said digital information terminals are selected from the group consisting of: personal computers, 3270 terminals and RS232 terminals.

5. A wireless in-building telecommunications system for data communications comprising:

a control module;

a plurality of user modules;

said control module having a plurality of data interface devices coupled to respective digital information sources for coupling data signals to the respective digital information sources;

said plurality of user modules having a plurality of data interface devices coupled to respective digital information terminals for coupling data signals to the respective digital information terminals;

said control module having a packet switch coupled to said plurality of data interface devices via a network interface bus, at least one of said data interface devices coupled to a radio which communicates with said plurality of user modules via a shared RF communications channel;

said plurality of user modules having a packet switch coupled to said plurality of data interface devices via a network interface bus, at least one of said data interface devices coupled to a radio which communicates with said control module via said shared RF communications channel.

\* \* \* \* \*